United States Patent
Smith et al.

(10) Patent No.: US 7,739,311 B2
(45) Date of Patent: Jun. 15, 2010

(54) METHOD AND SYSTEM FOR HANDLING LARGE DATA SETS IN A STATISTICAL LANGUAGE

(75) Inventors: David M. Smith, Seattle, WA (US); Michael J. Sannella, Seattle, WA (US); Charles B. Roosen, Seattle, WA (US); William W. Dunlap, Mount Vernon, WA (US)

(73) Assignee: TIBCO Software Inc., Palo Alto, CA (US)

( * ) Notice: Subject to any disclaimer, the term of this patent is extended or adjusted under 35 U.S.C. 154(b) by 53 days.

(21) Appl. No.: 11/400,070

(22) Filed: Apr. 7, 2006

(65) Prior Publication Data

US 2007/0040094 A1 Feb. 22, 2007

Related U.S. Application Data

(60) Provisional application No. 60/669,854, filed on Apr. 7, 2005.

(51) Int. Cl.
*G06F 17/30* (2006.01)
*G06F 17/00* (2006.01)

(52) U.S. Cl. ................................. 707/802; 707/813
(58) Field of Classification Search ........................ None
See application file for complete search history.

(56) References Cited

U.S. PATENT DOCUMENTS

| | | | |
|---|---|---|---|
| 5,963,879 A * | 10/1999 | Woodward et al. | 702/17 |
| 6,262,740 B1 | 7/2001 | Lauer et al. | 345/424 |
| 6,421,665 B1 * | 7/2002 | Brye et al. | 707/3 |
| 6,442,666 B1 | 8/2002 | Stracovsky | 711/206 |
| 6,480,950 B1 * | 11/2002 | Lyubashevskiy et al. | 711/206 |
| 6,492,989 B1 * | 12/2002 | Wilkinson | 345/440 |
| 7,191,183 B1 * | 3/2007 | Goldstein | 707/101 |
| 7,272,590 B2 * | 9/2007 | Arning et al. | 707/2 |
| 2002/0129003 A1 * | 9/2002 | Bakalash et al. | 707/1 |
| 2003/0144753 A1 | 7/2003 | Otani et al. | 700/87 |
| 2004/0205697 A1 | 10/2004 | Hylands et al. | 717/106 |
| 2005/0066147 A1 | 3/2005 | Miller et al. | 711/207 |

OTHER PUBLICATIONS

"Getting Started with S-PLUS 5.1," Mathsoft, Inc., Seattle, Washington, May 1999, 7 pages.
Documentation for function "openData" as shipped with S-PLUS 5.1 Release, 1999, On-line help files.
Documentation for function "importData" as shipped with S-PLUS 5.1 Release, 1999, On-line help files.
Source code for function "lmBlock" from S-PLUS 5.1 Release, library example 5, 1999.

* cited by examiner

*Primary Examiner*—Yicun Wu
(74) *Attorney, Agent, or Firm*—Black Lowe & Graham PLLC

(57) ABSTRACT

Methods and systems for providing support for large data sets are provided. Example embodiments provide a Big Data Object Library "BDOL," which defines data structures and routines for handling big data objects using out of memory techniques. In one embodiment, the BDOL defines a bdFrame object which stores the data in binary form in a cache on an external storage medium, such as a file on a disk. The example BDOL provides support for user defined block processing a bdFrames using a pipeline engine. Also, the BDOL provides for Trellis plots, and other charts, of big data objects using hexagonal binning. This abstract is provided to comply with rules requiring an abstract, and it is submitted with the intention that it will not be used to interpret or limit the scope or meaning of the claims.

23 Claims, 39 Drawing Sheets bdInternalCache Object

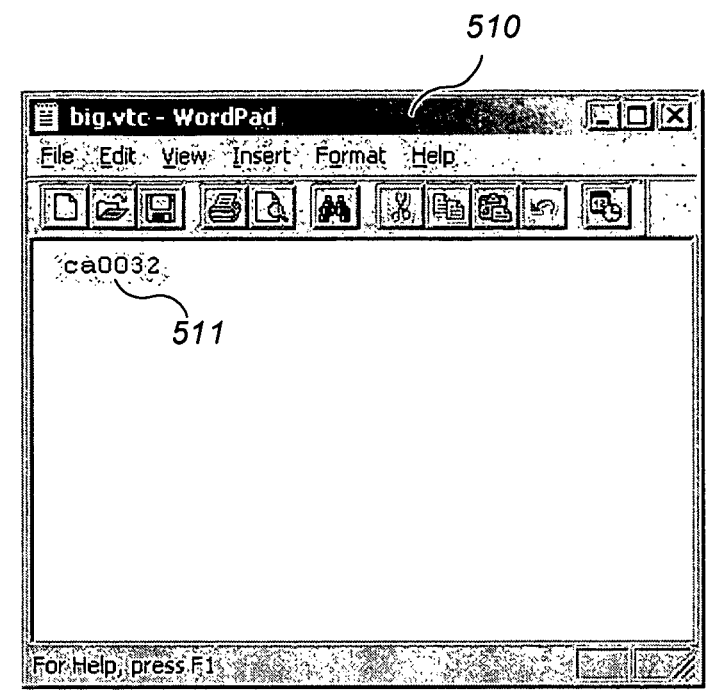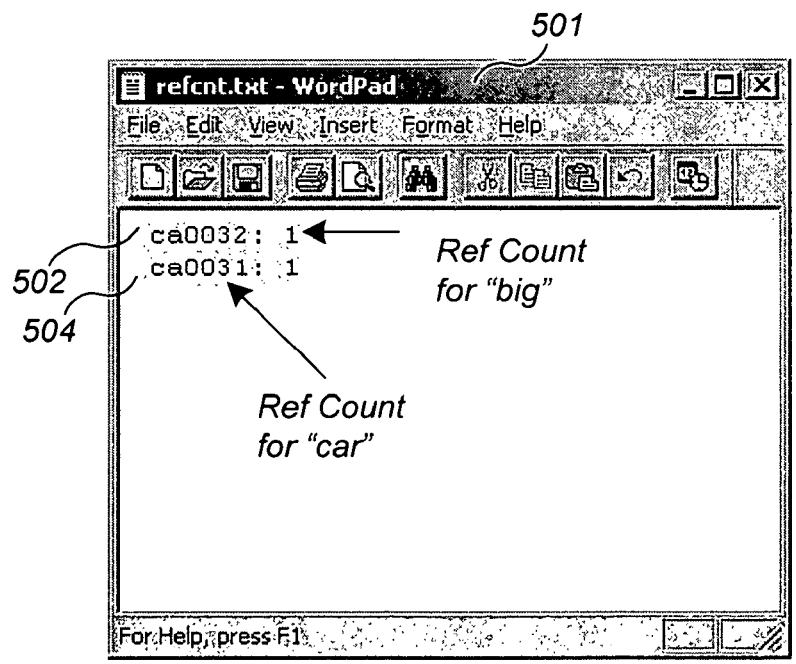
Fig. 5

```xml
?xml version="1.0" encoding="UTF-8"?>
<IMML version="7.0">
    <XTMetaData>
        <ColumnDefinitions fieldCount="5">
            <ColumnInfo name="Weight" type="continuous"/>
            <ColumnInfo name="Disp." type="continuous"/>
            <ColumnInfo name="Mileage" type="continuous"/>
            <ColumnInfo name="Fuel" type="continuous"/>
            <ColumnInfo name="Type" type="categorical">
                <Level value="Small"/>
                <Level value="Sporty"/>
                <Level value="Compact"/>
                <Level value="Medium"/>
                <Level value="Large"/>
                <Level value="Van"/>
            </ColumnInfo>
        </ColumnDefinitions>
        <ColumnStats>
            <TableStats rowCount="60"/>
            <UnivariateStats field="Weight">
                <NumericInfo mean="2900.8333333333335" minimum="1845.0" maximum="3855.0" standardDeviation="495.86610298587215" median="NaN" interQuartileRange="NaN" />
                <Counts totalFreq="60" missingFreq="0" />
            </UnivariateStats>
            <UnivariateStats field="Disp.">
                <NumericInfo mean="152.05000000000004" minimum="73.0" maximum="305.0" standardDeviation="54.160910602464334" median="NaN" interQuartileRange="NaN" />
                <Counts totalFreq="60" missingFreq="0" />
            </UnivariateStats>
            <UnivariateStats field="Mileage">
                <NumericInfo mean="24.583333333333332" minimum="18.0" maximum="37.0" standardDeviation="4.791559198008782" median="NaN" interQuartileRange="NaN" />
                <Counts totalFreq="60" missingFreq="0" />
            </UnivariateStats>
            <UnivariateStats field="Fuel">
                <NumericInfo mean="4.210032618382371" minimum="2.702702702702703" maximum="5.555555555555555" standardDeviation="0.7575257934506004" median="NaN" interQuartileRange="NaN" />
                <Counts totalFreq="60" missingFreq="0" />
            </UnivariateStats>
            <UnivariateStats field="Type">
                <NumericInfo mean="2.083333333333333" minimum="0.0" maximum="5.0" standardDeviation="1.586934649543233" median="NaN" interQuartileRange="NaN" />
                <Counts totalFreq="60" missingFreq="0">
                    <Category value="Small" freq="13" />
                    <Category value="Sporty" freq="9" />
                    <Category value="Compact" freq="15" />
                    <Category value="Medium" freq="13" />
                    <Category value="Large" freq="3" />
                    <Category value="Van" freq="7" />
                </Counts>
            </UnivariateStats>
        </ColumnStats>
    </XTMetaData>
</IMML>
```

Fig. 7

*Example1.ssc:*          *1201*

```
bdBlockExample1<-
function(SP)
{                        1202          1203
    x=SP$in1$Weight
    cat("WeightValue=", x,"\n\n")
    data.frame(SP$in1,WeightTimes.two=x*2)
           1204
}
```

Command Window:     *1220*

```
> bd.block.apply(big, bdBlockExample1)
WeightValue= 2560 2345 1845 2260 2440 2285 2275 2350 2295
1900 2390 2075 2330 3320 2885 3310 2695 2170 2710 2775
2840 2485 2670 2640 2655 3065 2750 2920 2780 2745 3110
2920 2645 2575 2935 2920 2985 3265 2880 2975 3450 3145
3190 3610 2885 3480 3200 2765 3220 3480 3325 3855 3850
3195 3735 3665 3735 3415 3185 3690
```
    *1221*

```
** bdFrame: 60 rows, 6 columns **
  Weight Disp. Mileage    Fuel Type WeightTimes.two
1   2560   97     33 3.030303 Small       5120
2   2345  114     33 3.030303 Small       4690
3   1845   81     37 2.702703 Small       3690
4   2260   91     32 3.125000 Small       4520
5   2440  113     32 3.125000 Small       4880
  ... 55 more rows ...
>
```
    *1222*

*Fig. 12*

```
bd.options(block.size=25)

bdBlockExample3<-
function(SP)
{
    x=SP$in1$Weight
    cat("Next Row#", SP$in1.pos, "Weight=", x, "\n\n")
    data.frame(SP$in1,WeightTimesTwo=x*2)
}
```

Command Window:

```
> bd.block.apply(big, bdBlockExample3)
Next Row# 1 Weight= 2560 2345 1845 2260 2440 2285 2275
2350 2295 1900 2390 2075 2330 3320 2885 3310 2695 2170
2710 2775 2840 2485 2670 2640 2655

Next Row# 26 Weight= 3065 2750 2920 2780 2745 3110 2920
2645 2575 2935 2920 2985 3265 2880 2975 3450 3145
3190 3610 2885 3480 3200 2765 3220 3480

Next Row# 51 Weight= 3325 3855 3850 3195 3735 3665 3735
3415 3185 3690 bdFrame: 60 rows, 6 columns 
  Weight Disp. Mileage   Fuel Type WeightTimes.two
1   2560   97      33 3.030303 Small          5120
2   2345  114      33 3.030303 Small          4690
3   1845   81      37 2.702703 Small          3690
4   2260   91      32 3.125000 Small          4520
5   2440  113      32 3.125000 Small          4880
 ... 55 more rows ...
>
```

| | Weight numeric | Disp. numeric | Mileage numeric | Fuel numeric | Type factor |
|---|---|---|---|---|---|
| 33 | 2,645.00 | 151.00 | 23.00 | 4.35 | Compact |
| 34 | 2,575.00 | 116.00 | 24.00 | 4.17 | Compact |
| 35 | 2,935.00 | 135.00 | 23.00 | 4.35 | Compact |
| 36 | 2,920.00 | 122.00 | 27.00 | 3.70 | Compact |
| 37 | 2,985.00 | 141.00 | 23.00 | 4.35 | Compact |
| 38 | 3,265.00 | 163.00 | 20.00 | 5.00 | Medium |
| 39 | 2,880.00 | 151.00 | 21.00 | 4.76 | Medium |
| 40 | 2,975.00 | 153.00 | 22.00 | 4.55 | Medium |
| 41 | 3,450.00 | 202.00 | 22.00 | 4.55 | Medium |
| 42 | 3,145.00 | 180.00 | 22.00 | 4.55 | Medium |
| 43 | 3,190.00 | 182.00 | 22.00 | 4.55 | Medium |
| 44 | 3,610.00 | 232.00 | 23.00 | 4.35 | Medium |
| 45 | 2,885.00 | 143.00 | 23.00 | 4.35 | Medium |

Total number columns: 5  Numeric columns: 4
Total number rows: 60  Factor columns: 1
String columns: 0
Date columns: 0

*Fig. 14C*

METHOD AND SYSTEM FOR HANDLING LARGE DATA SETS IN A STATISTICAL LANGUAGE

TECHNICAL FIELD

The present disclosure relates to methods and systems for working with very large data sets in a statistical language and, in particular, to methods and systems for managing and/or processing large data using out-of-memory techniques.

BACKGROUND

Current statistical languages allow developers of analytics, statistical programs, and other applications and other users, such as consumers of analytics, (hereinafter referred to generically as "users") the ability to input and analyze a wide variety of data. However, the operations typically supported by such languages operate on data "in memory." In $4^{th}$ Generation Languages (4GL) languages, such as S-PLUS, the data is processed in an object-oriented fashion that is intuitive, but sometimes space consuming, because an object is created in-memory to hold the data as it is being manipulated by the statistical operations. That is, as long as the data to be processed fits in memory all at once, these operations can succeed. Thus, the operations can only handle as much data (or as large a data set) as the memory supports. Memory includes, for example, both available RAM and virtual memory, in environments where such is supported. (Virtual memory is typically supported by a swap space on an external disk drive, which is accessed as if it were RAM.) Note that, as used here, the terms "data," a "set of data," or "data set" can be used interchangeably and indicate one or more items that are being processed together.

For example, if the task at hand is use statistical models to analyze a data set, then the entire data set is read into memory as an object so that statistical operations can efficiently be applied to the data. Typically, modeling such data sets requires several copies of the data to be created, for example 3-10 copies, while the analytic is being performed. In such cases, the amount of data that can be handled at once is thereby limited by the amount of memory readily available.

Although in some modern computer systems a large virtual memory space can be accommodated, especially with 64-bit computing devices, statistical operations that operate on large data may use the virtual memory in such a way (e.g., with random access of data) that the program "thrashes"—causing memory pages to be continuously swapped in and out. Thrashing in this manner causes huge performance issues, rendering the use of virtual memory for such analytic tasks impracticable.

In addition, in some instances programs created using the statistical language that have been operable at some point, for example, during prototyping, may suddenly not work as the data grows beyond the capacity of the memory, such as when the programs are placed in production. Sometimes such issues remain undetected until the program is placed in the field. To attempt to solve such data set problems, the ultimate consumer of the program may end up sampling or otherwise aggregating the data set into smaller portions that can be appropriately analyzed or operated upon. Sub-setting the data in this manner may, in some scenarios, generate incorrect results, or at least inject a degree or error where it is not desired. In addition, it is not possible in all applications of a particular statistical scenario to subset the data at all—in those cases, the program is simply non operable.

Moreover, customers are desiring to process data that is hundreds of megabytes up to tens or even hundreds of gigabytes in size. Traditional in-memory models cannot support such data sizes, which are increasing at a faster growth rate than the memory capacity of computer systems for processing such data.

BRIEF DESCRIPTION OF THE DRAWINGS

FIG. 5 are example contents of various files using to track big data objects including for reference counting purposes.

FIG. 7 is example contents of a metadata file of a big data object.

FIG. 12 is example pseudo code and execution results for a user defined function that processes big data in blocks to perform a transformation on data.

FIG. 13 is example pseudo code and execution results for a user defined function that processes big data in blocks to perform a different transformation on data.

FIGS. 14A-14E are example screen displays for a data viewer that supports viewing a big data object.

DETAILED DESCRIPTION

Figure 1:
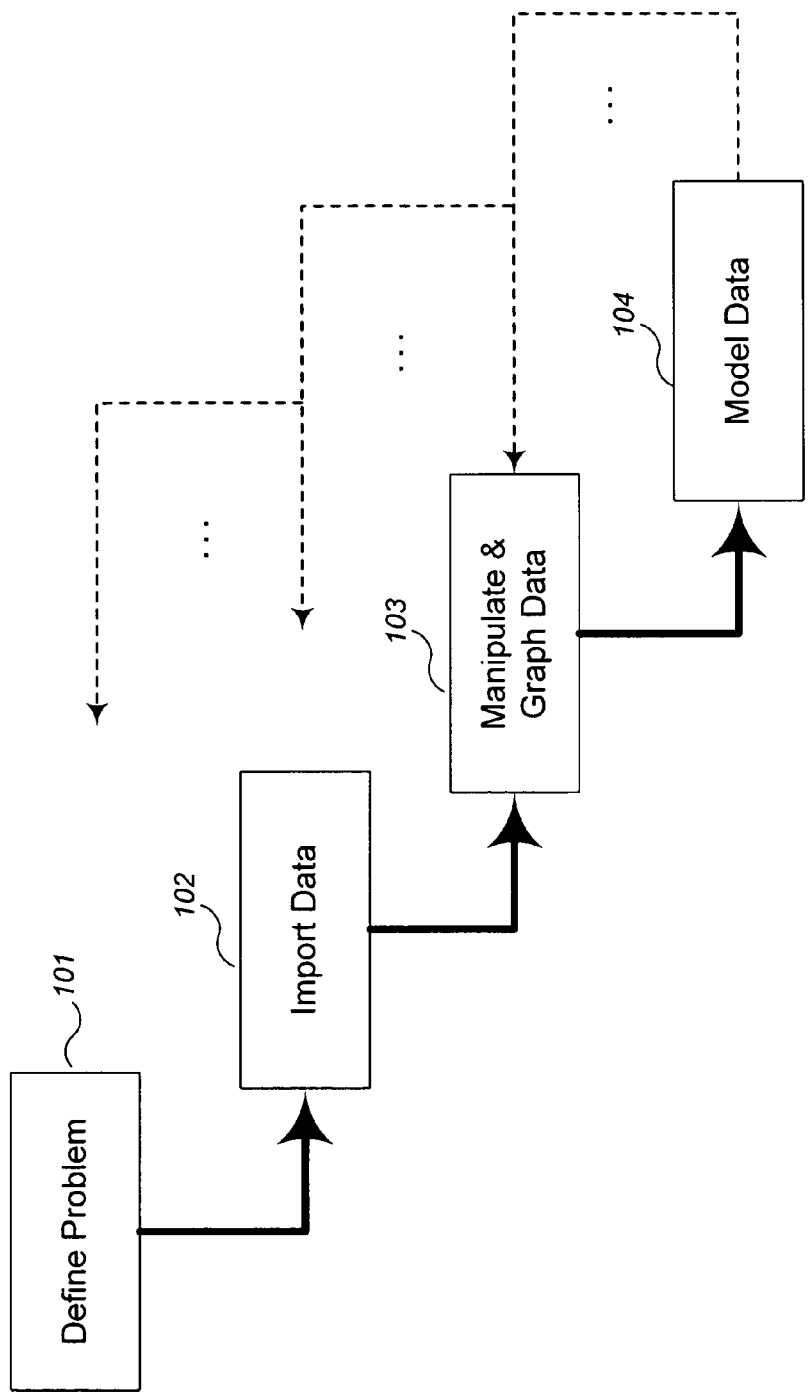
FIG. 1 is an example block diagram of an overall process for working with a large data set.

Embodiments described herein provide enhanced computer- and network-based methods, systems, and data structures for handling large data sets in a statistical language. Example embodiments provide a Big Data Object Library (or System) ("BDOL"), which enables users to process virtually unlimited size data sets using out of memory techniques. The BDO library supports a plurality of data structures known as big data objects ("BDOs") and code (routines, objects, classes, invocation methods, etc.) that can be integrated by a programmer in the statistical language into current or new programs. In an example embodiment, a BDOL has been created for the S-PLUS programming language, available commercially in S-PLUS® 7.0 Enterprise Developer and S-PLUS® 7.0 Enterprise Server. According to this embodiment, various new S-PLUS objects are defined that store data out of memory in one or more "cache" structures. Typically, such caches are stored as files in a directory of a file system; however, any out of memory location for storing data could be incorporated. The BDOL S-PLUS embodiment (hereinafter "BDOLS") defines routines that can manipulate, process, and present such data efficiently—even though the data resides on an external storage medium. These routines are optimized to process out of memory data a row (block, or chunk) at a time, minimizing the number of passes through the external storage object. In this manner, big data objects (BDOs) enable a programmer, statistician, client, or any other type of user to perform analytics that are no longer limited to the internal memory of the computing device.

Although the BDOL is being described relative to the S-PLUS language, the same techniques, structures, code, methods, and systems can be applied to other languages, statistical or not that suffer from similar issues. The concepts and techniques described are applicable to any environment where data cannot be processed or otherwise handled in memory, and virtual memory does not provide a practical solution. In addition, although particular routines are described relative to the example embodiment, the BDOL may be easily extended to support additional and/or other routines as user needs are identified and as new algorithms that perform analysis, transformation, or other processing a block of rows at a time, are developed. Also, although the majority of this description refers to "objects" and "object-oriented" concepts, equivalent non-object-oriented data structures, code, and techniques can be used to implement these concepts.

Also, although certain terms are used primarily herein, other terms could be used interchangeably to yield equivalent embodiments and examples. For example, it is well-known that equivalent terms in the data modeling and statistical analysis fields and in other similar fields could be substituted for various terms. Also, terms such as data are non-specific as to the type of content, unless otherwise indicated. In addition, terms may have alternate spellings which may or may not be explicitly mentioned, and all such variations of terms are intended to be included.

FIG. 1 is an example block diagram of an overall process for working with a large data set. The process shown in FIG. 1 is meant to illustrate how a user looking to solve a problem might work with data, a large data set or otherwise. The first task a user confronts is to define the problem being solved, task 101. Some key things here are to determine the objective of the inquiry—what is the user trying to find out, and what variables in the data may provide answers to the questions. At this point, the user may try to design a model to predict the answers. The second task is to import the data 102 from the sources of interest. The example embodiment provides different ways to do this, including an "import" command that allows very large data sets to be read and stored in the appropriate BDO files (the cached files). The different files that are created are described below with reference to FIGS. 4 and 5. Once the appropriate data is imported, then in the task 103, the user needs to manipulate, view, and otherwise process the data in order to decide (better) ways to model the data. The better the tools available to perform these tasks, the easier it is for the user to notice trends and develop predictive or explanatory models. The manipulate and graph task 103 includes things like cleaning, filtering, sorting, and preprocessing the data in other ways, including creating new variables that are aggregates or other combinations of others, as well as using graphing, plotting, and presentation tools to view the data. After successfully manipulating and examining the data, then the user models the data in the last task 104. Example modeling of big data supported by a BDOL includes generating linear regression models, generalized linear models, principal components analyses, and clustering. Note that, although a linear progression through the tasks is shown, any task may be repeated at any point to further refine an understanding of the data, including potentially even redefining the problem.

As mentioned, large data sets present all kinds of challenges to the programmer and to other users. Once data is stored out of memory, routines needed to be used and created that operate upon such data. Such routines are provided by the BDOL and can be used to create additional user-defined enhancements to big data object ("BDO") support as an integral part of the system.

The BDOLS embodiment supports a new data type for a big data object, the bdFrame object, which is a "big data" version of the data frame S-PLUS object. (Note that S-PLUS objects may be referred to herein for simplicity as S-objects. They may include normal and big data objects, depending upon the context in which the term is used.) It also provides support for several other types (sub-types of BDOs), including other classes (from which objects can be instantiated), for example: bdVector, bdCharacter, bdFactor, bdLogical, bdNumeric, bdTimeDate, bdTimeSpan, bdLM, bdGLM, bdPrincomp, bdCuster, bdSeries, bdTimeSeries, and bdSignalSeries classes. Other classes can be defined.

Big data objects such as bdFrames exhibit a number of characteristics. First, the bdFrameObject stores its data externally (such as on disk). The memory footprint for the object is then much smaller then for the comparable S-PLUS data frame object. Note that this description refers to storing the data for a BDO on disk or in a cache. This will be understood to included all types of none "core" memory (system RAM) where a large data structure can be stored as chunks of data, even those memory devices that have yet to be developed. Also, although a bdFrame object can have any number of rows (limited perhaps by the external storage available), it does not have row labels. This reduces memory consumption for the data. Also, bdFrame objects can contain a vary large number of columns, typically in the tens of thousands or more; however, the columns are of specific types. Currently, the list of types includes: double, character, factor, timeDate, timeSpan, or logical. This list may of course be modified in future or in other embodiments; the purpose of such limitations is to ensure that the binary cache file representing the data is as compact as possible and can be efficiently addressed.

Presenting big data objects also poses challenges. Several functions, such as print( ), have been modified so that only the first few rows of a bdFrame are shown. Generally, BDOL functions carefully avoid accidental generation of reams of output when BDOs are displayed.

In addition, the BDOL tracks summary statistics for BDOs as metadata, which will be described in more detail in the figures below. These metadata include various statistical information on each column in a BDO. Moreover, the metadata are precalculated and kept current—thus, when certain information is needed, the answers may be readily apparent by looking up metadata. Thus allows functions such as the summary( ) function to be quite fast even though it is processing a very large data set, because the function has only to retrieve metadata already computed.

In the example BDOLS, BDOs also support most of the standard S-PLUS functions, operators, etc. so that such routines may be used transparently with bdFrames or with data frames. The BDOLS does support a variety of new functions that work specifically with BDOs in an optimized fashion. Generally, such functions attempt to minimize passes through the data, since the data is stored externally, requiring, in a typical machine, the user of slow I/O (input/output) routines. These new functions and capabilities are described further below. In overview, there are new functions for data exploration, data manipulation, graphical presentation, and data modeling. A key characteristic of such functions (including those to be user defined) are that they need to process the data from the external cache a row or a block (number of rows) at a time. Even so, functions that operate on BDOs can perform many transformations and computations based upon interactions between the variables as the data is read in row-by-row, or block-by-block. Therefore, BDOs have given rise to statistical models that do not require separate steps to preprocess the data.

For example, in-memory statistical functions typically require a separate step (in this case a pass through the data) for each transformation. Thus, a model that uses $x^2$ required a pass through the data to compute the square of x prior to modeling. As this is not practical with very large data, algorithms that perform column calculations as rows are read in are more common with big data functions. Note that particular algorithms are not described for the functions, because the functions rely on algorithms that are available in the public domain. Again, a key characteristic of any such algorithm is that it be able to process data a row at a time.

Example embodiments described herein provide applications, tools, data structures and other support to implement a BDOL used for handling large data sets. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 2:
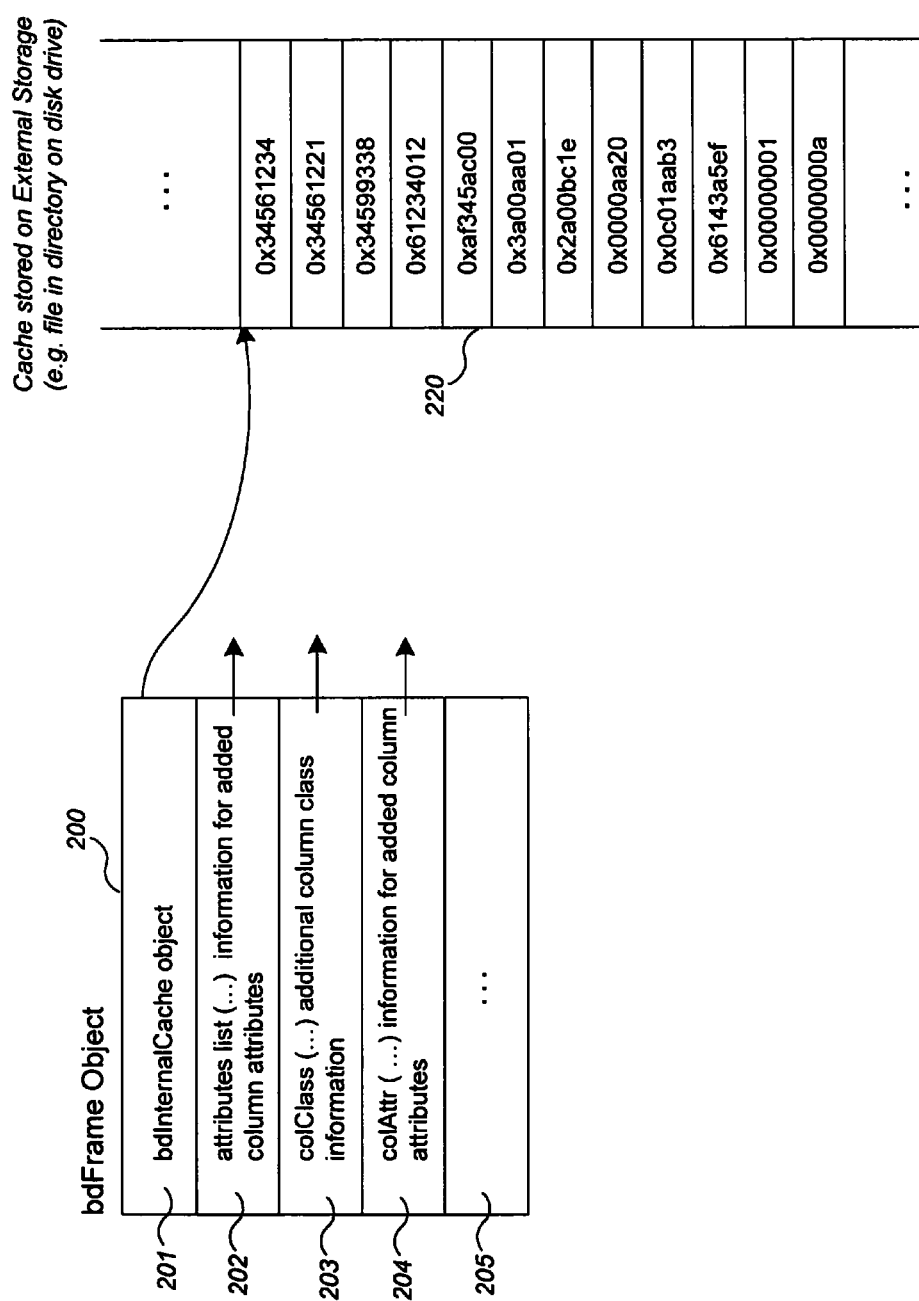
FIG. 2 is an example block diagram of the structure of a big data object (a bdFrame object) as provided by a Big Data Object Library.

FIG. 2 is an example block diagram of the structure of a big data object (a bdFrame object) as provided by a Big Data Object Library. In FIG. 2, an instance of a bdFrame object 200 is illustrated as it conceptually appears in memory (RAM). The bdFrame object 200 is shown pointing to an area, cache 220, of an external storage medium, such as a file in a directory on a disk drive. Although the cache 220 is herein represented as sequence of contiguous values stored on the external medium, it is to be understood that other types of organization on the external storage medium can be accommodated, and that the standard capabilities of programs such as a file system or device driver can be used to hide the actual organization of the cache from the BDOL. Note that, in the particular embodiment shown, the cache 220 contains binary data, as double longs, in row order. Other layouts could be similarly supported.

As demonstrated in FIG. 2, the bdFrame object 200 includes an instance of a bdInternalCache object 201, an attributes list 202, a colClass field 203, a colAttr field, and other fields as needed. The bdInternalCache object 201 is the "lowest" level of BDO handled by the BDOL—it is the in-memory data structure that points to the cache. The organization of a typical bdInternalCache object 201 is described with reference to FIG. 3. The other fields are primarily stored in the bdFrame object 200 for optimization purposes—that is to make it easy (fast) to access certain information that doesn't require a lot of RAM to store. For example, attribute list 202 contains a set of (typically user-defined) attributes that may be defined for a BDO. Similarly, the colClass field 203 and colAttr field 204 contain additional information that may be stored for particular classes of columns. For example, logical class columns maintain some information to translate internal values to "T" (for true) and "F" (for false).

Figure 3:
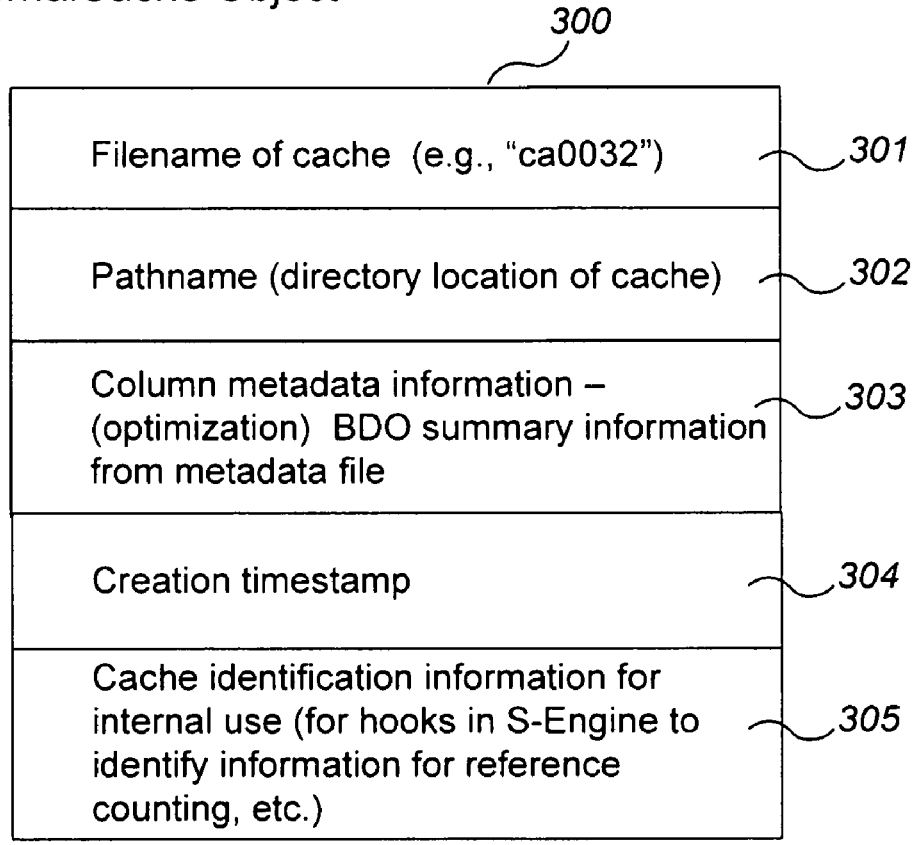
FIG. 3 is an example block diagram of the structure of an in-memory representation of an internal cache object (an bdInternalCache object).

FIG. 3 is an example block diagram of the structure of an in-memory representation of an internal cache object (an bdInternalCache object). The bdInternalCache object (instance) 300, as described with reference to FIG. 2, is the object that actually points to the data cache 220. As illustrated here, the bdInternalCache object 300 may also comprise other fields, which are present primarily as optimizations for more efficient access to aspects of large data objects. For example, field 301 stores the name of the cache file, typically a filename. Note that the "base" of the filename is stored so that all of the files pertaining to the BDO can be accessed from this base name (e.g., a <base>.dcf (data cache) file, a <base>.mdf (metadata file), and a <base>.dbf (blob) file). Field 302 stores the pathname used to locate the cache and associated BDO files. Field 303 stores metadata information pertaining to the BDO. Note that this field is present primarily for optimization purposes—it is typically a copy of the metadata information for each column, along with a designation of the number of rows (if known) and the number of columns for the bdFrame object. The metadata information stored for each column is described with reference to FIG. 6, and an example of the metadata file is described with reference to FIG. 7. In addition to the metadata, the bdInternalCache object 300 stores a creation timestamp 304 and cache identification information in the form of a "signature" that can be used by the BDOL to perform reference counting.

Of note, the BDOL is responsible for garbage collection of the big data objects. In order to perform reference counting without a great deal of added overhead on the underlying S-Engine (the code, libraries, and interpreter that implements S-PLUS), the BDOL inserts hooks in the routines that allocate variables. These hooks look at S-objects to determine whether a "cache" signature is present, and, if so, perform the reference counting. The particular signature is used to track which variables currently refer to BDOs, and to maintain the appropriate reference count.

Figure 4:
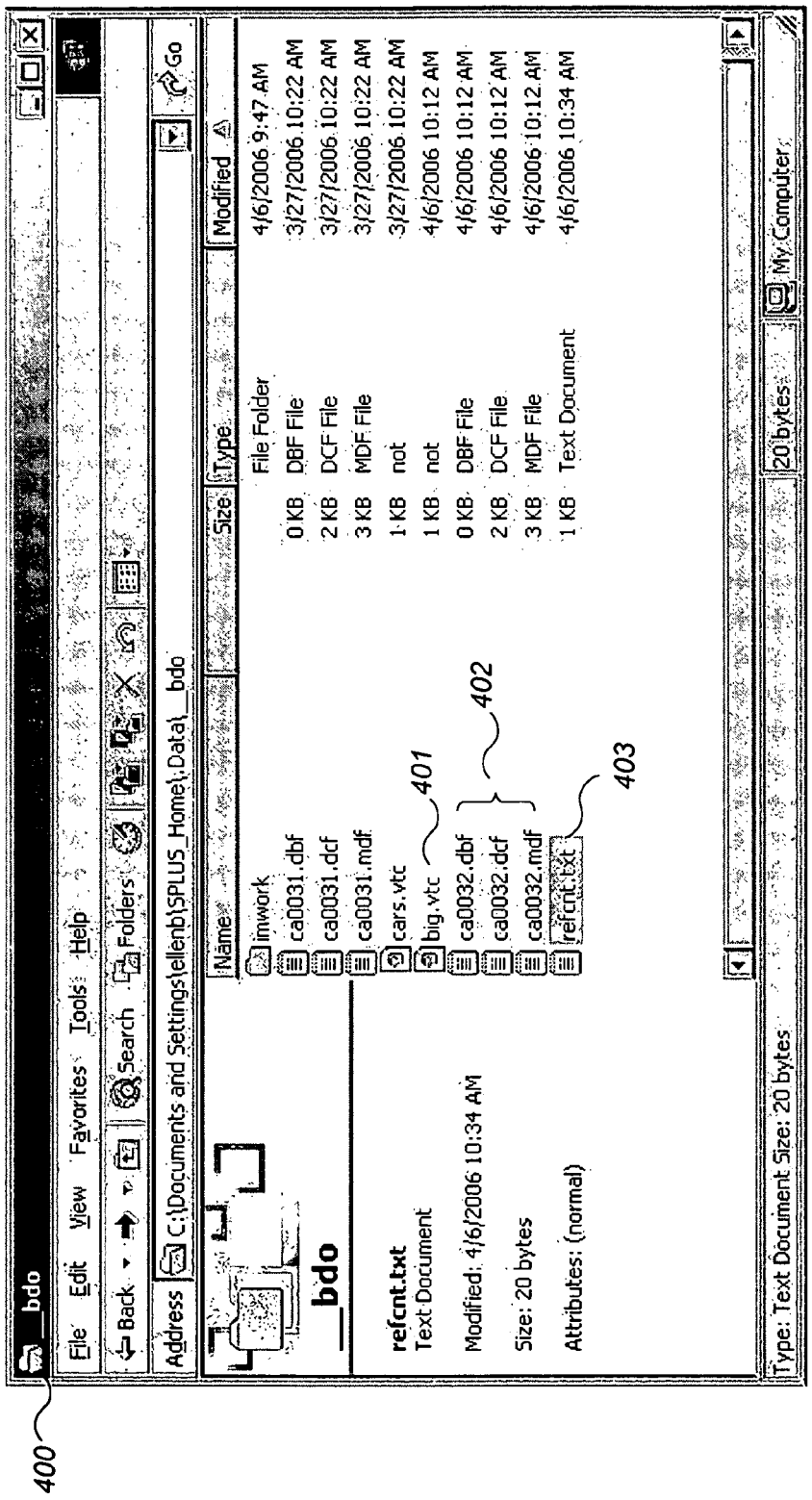
FIG. 4 is an example screen display of a directory in a file system that stores the cache and related files for a big data object.

FIG. 4 is an example screen display of a directory in a file system that stores the cache and related files for a big data object. In FIG. 4, the screen display 400 shows a BDO directory ("_BDO") 400 which, among other files, contains a file 401 corresponding to the variable "big" called "big.vtc." For the purposes of demonstration for this description, a variable that represents a BDO called "big" has been defined. The variable "big" stores a bdFrame object that contains data from a sample data set called "fuel.frame." Although this sample data comes from an S-object that is sufficiently small to fit in RAM, it has been converted (coerced) to a bdFrame using "as.bd.Frame("fuel.frame")" in order to demonstrate concepts herein.

FIG. 5 are example contents of various files using to track big data objects including for identification and reference counting purposes. As can be seen in FIG. 5, the contents of the file "big.vtc" 510 contain the base name for the BDO related files, in this case "ca0032." Thus, referring back to the BDO directory 400 in FIG. 4, the directory 400 also contains three BDO related files 402: "ca0032.dbf;" "ca0032.dcf;" and "ca0032.mdf." These files are respectively a data blob file (if/when used by the BDO), the cache of binary data itself, and a metadata file. In addition, the BDO directory 400 contains a file called "refcnt.txt" 403, which contains the reference counts for BDOs. An example of the content for the "refcnt.txt" file 501 is shown in FIG. 5. The "refcnt.txt" file 501 contains a list of two BDOs, ca0032 502 and ca0031 504, which contain a reference count of 1 each respectively. This can be observed from FIG. 4, where if one were to examine the files, one would figure out that the variable "cars" is another BDO, represented by the files "ca0031.*".

Note that, in the BDOLS, a function "bd.cache.info" is supported, which can be used to find out lots of information regarding what caches and BDO related files are in the BDO directory, what variables they correspond to, the reference counts etc. In addition, the BDOLS offers a "bd.cache-.cleanup" command for removing any "hanging" cache information if for some reason the reference counting gets muddled with and files are lingering.

Figure 6:
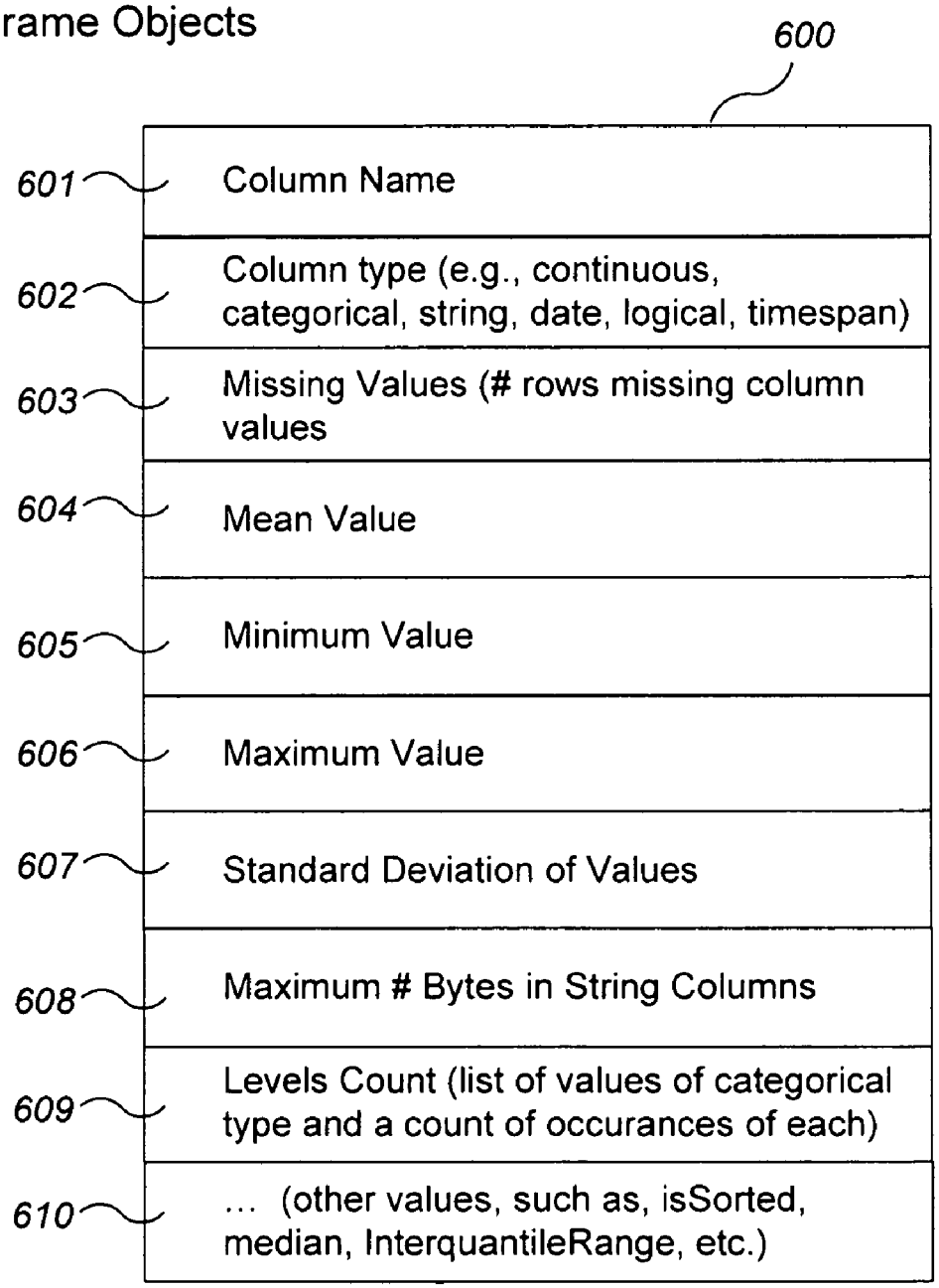
FIG. 6 is an example block diagram of metadata values stored for each column in a big data object.

FIG. 6 is an example block diagram of metadata values stored for each column in a big data object. Recall that these values are stored for each column in the bdInternalCache object as an optimization and also in a metadata file that corresponds to the data cached. The metadata 600 for each column, according to one embodiment includes: a column name 601; a column type indication 602, a count of the number of missing values 603 for that column (rows that have no data for that column); a mean value 604; a minimum value 605; a maximum value 606; a standard deviation for the values 607; a maximum number of bytes that can be used for a character string if the column contains strings; a list of the levels if the column is a categorical type and a count 609 of the occurrences of values of each level; and other values. For example, in the BDOLS embodiment, the metadata file currently indicates room for a median value and an interquantile range value although these fields are not currently utilized. It is also contemplated that certain characteristics of the column might also be indicated, such as whether the column has been sorted. Other metrics can also be tracked and this is just one example of a set that the BDOLS finds useful to precompute.

FIG. 7 is example contents of a metadata file of a big data object. The contents of file 700 are stored in this example as XML tags; however, other equivalent indications could also be used. In file 700, the set of columns are first defined as ColumnDefinitions tag 701, which include the number of columns, followed by the statistics for each such column in ColumnStat tags 702-706. The statistics stored may mirror those described with reference to FIG. 6.

Figure 8:
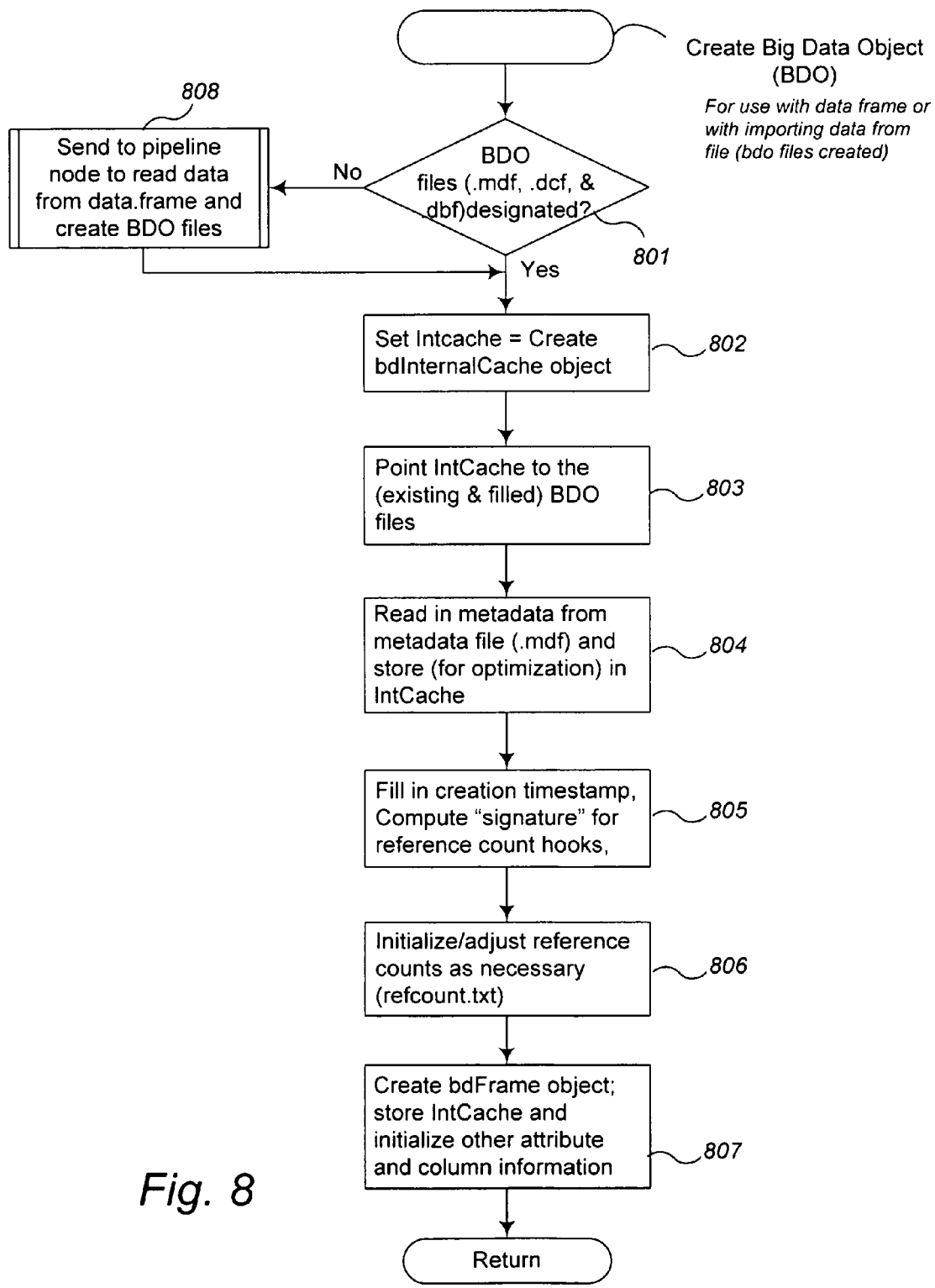
FIG. 8 is an example flow diagram of an example routine for creating a big data object from data.

FIG. 8 is an example flow diagram of an example routine for creating a big data object from data. Note that there are actually multiple routines provided by a BDOL for creating big data objects, FIG. 8 highlights the functionality that is provided by them without regard to which actual routine the functionality resides in. A user can create a BDO from a data frame object (a regular S-PLUS object) or by importing data from a data set using one of the import functions. In both cases, the BDO files described above with respect to FIGS. 4 and 5 are created, the data read in, and then the corresponding bdFrame objects are instantiated and populated.

More specifically, In step 801, the routine determines whether the corresponding BDO files have already been provided (such as from the import routine). If so, the routine continues with step 802, else continues with step 808. In step 808, the routine sends the data (from, for example, the designated data frame object) to code that can process the data row by row and create the (three) corresponding BDO files. In the BDOLS, this code is done by a pipeline engine, described further below, which interface to the S-engine to process data in a block-by-block (or row-by-row) fashion. In step 802, the routine instantiates a bdInternalCache object. In step 803, the routine points the bdInternalCache object to the (already created through, for example, import function or step 808) physical cache of binary data stored on the external medium. In step 804, the routine reads in metadata from the metadata file stored on the external medium and stores it in the bdInternalCache object (for example, in field 303 in FIG. 3). In step 805, the routine determines a timestamp, computes the signature for reference counting and identification purposes, and stores this information in the corresponding fields in the bdInternalCache object. In one embodiment, the signature is the count of bytes in the signature, followed by location information that identifies the cache on the external medium. In step 806, the routine stores initial information for a reference count to the BDO, for example in the "refcnt.txt" file. In step 807, the routine instantiates a bdFrame object that corresponds to the cache, stores (an indicator to) the bdInternalCache object instance, and initializes the other information for the other fields in the bdFrame object (such as object and column attribute information) as needed. The routine then returns (an indicator to) the newly created bdFrame object.

Note that a typical BDOL supports the specification of options that can be used when creating bdFrame objects. For example, in the BDOLS bd.options command, several options are supported that allow a user to specify particular features of a bdFrame, such as the maximum block size, the number of rows to print by default when printing a BDO, etc. Other options when creating a bdFrame include telling the BDOL how the data is intended to be used—such as random access, in sequential order, multiple passes, etc. This allows the internal BDOL support routines to optimize I/O when it can such as bring portions of a data cache to a local system in a multi-server implemented environment.

In some situations, use of BDOs is desired to process, for example, model data, even when the data set itself is not large. For example, it may be desirable to store a list of data models that have been created, so that processing of the list iterating on the models is possible. Even though an item on the list may not be too large to fit in memory, it may be likely that the list of models is too large to fit all at once. In such a case, it is desirable to temporarily "convert" each element on the list to a bdFrame to store the list, and then convert the item back when processing of the particular model is to be performed.

Figure 9:
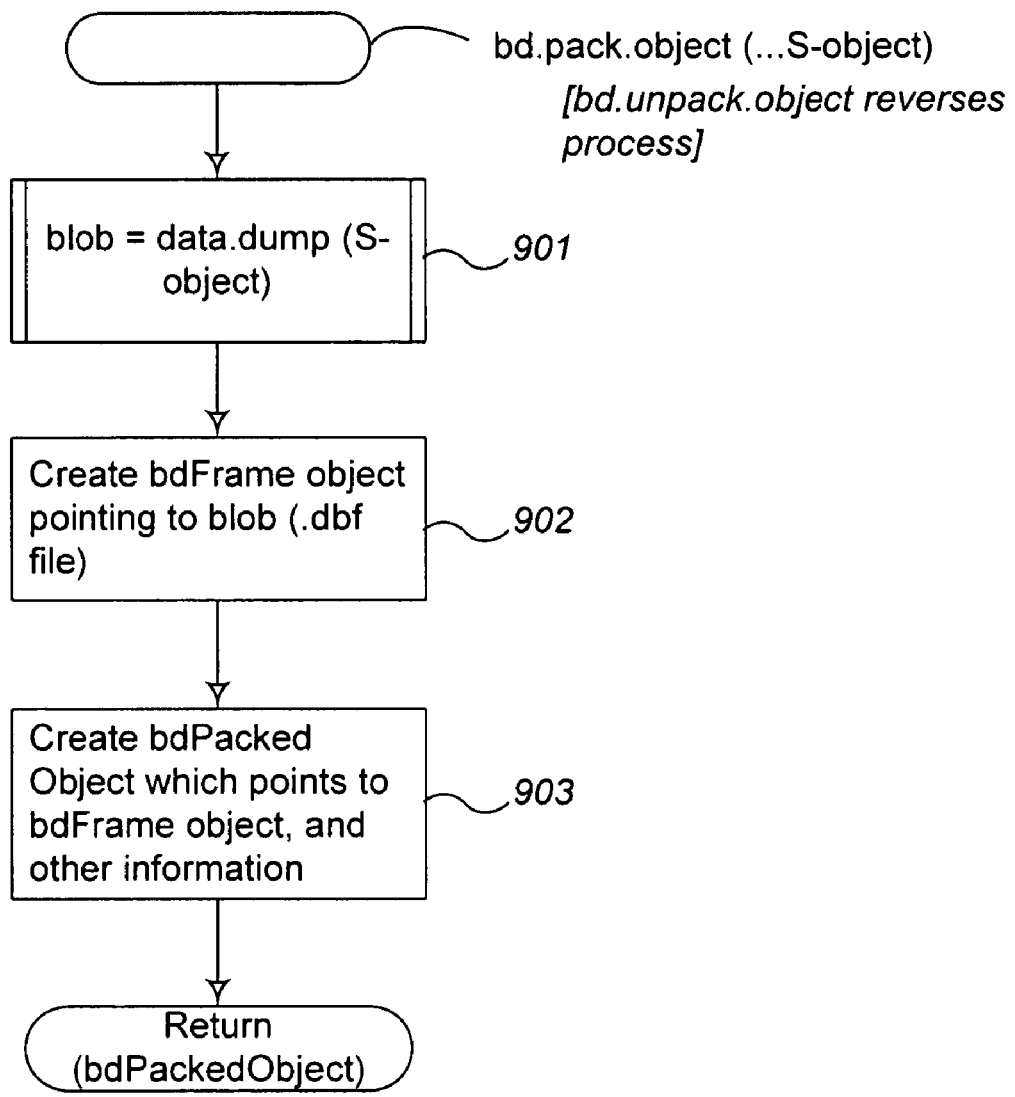
FIG. 9 is an example flow diagram of an example routine for packing (serializing) an S-PLUS object into a big data packed object.
Figure 11:
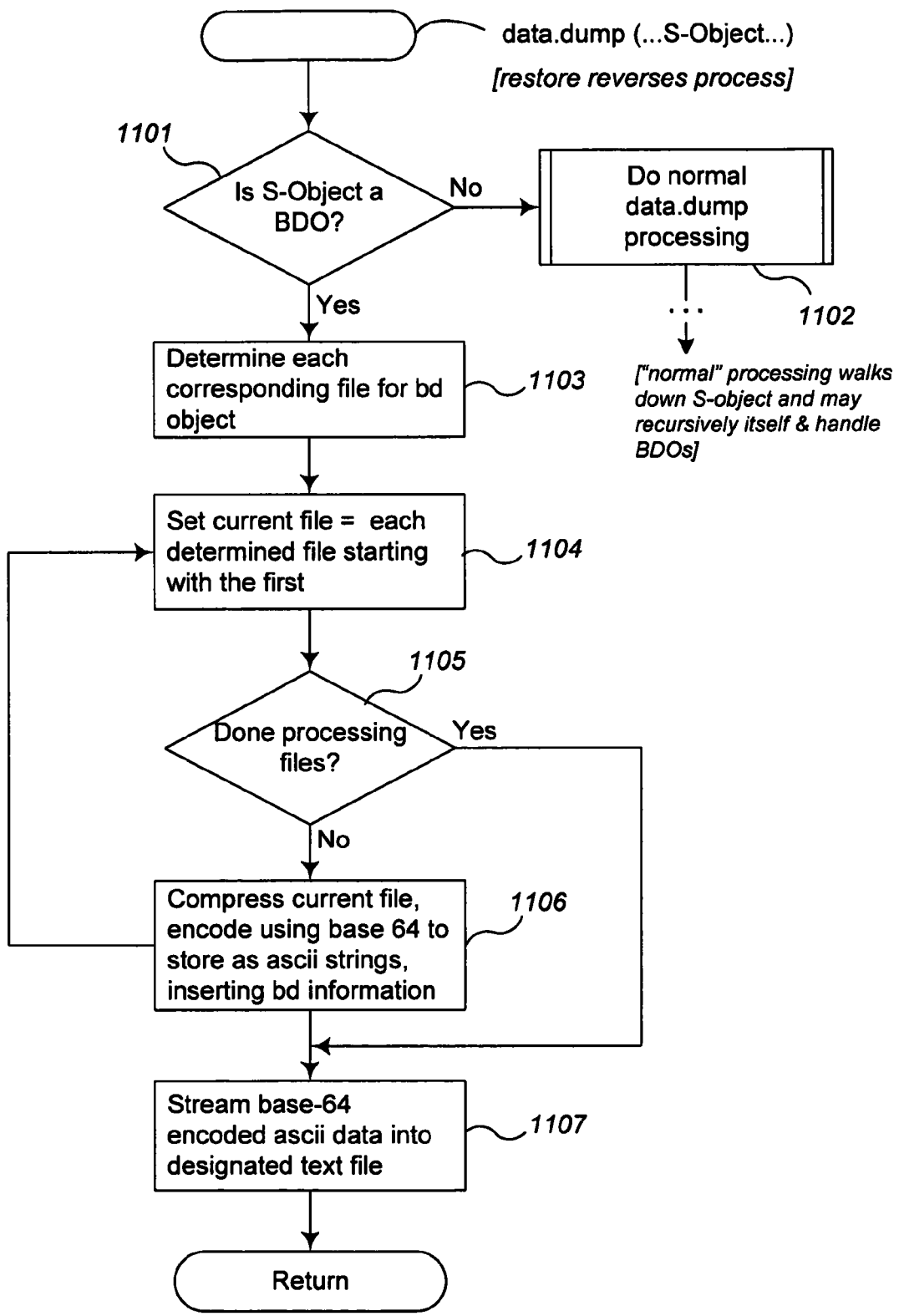
FIG. 11 is an example flow diagram of an example routine for serializing an S-PLUS object that is a big data object to be compatible with other types of serialized S-PLUS objects.

To perform such transformations, temporary or otherwise, the BDOL supports the "packing" and "unpacking" of S-objects, utilizing the caching techniques with serialized data. FIG. 9 is an example flow diagram of an example routine for packing (serializing) an S-PLUS object into a big data packed object. It invokes a standard (but modified as shown in FIG. 11) routine for serializing S-objects. Specifically, in step 901, the routine calls the routine "data.dump" in S-PLUS to serialize the S-object into ascii form. The data.dump routine walks (any) S-object and serializes it into a temporary file of ascii data, herein designated a "blob." As currently implemented, the routine calls itself recursively on all "contained" (or referenced) S-objects. A modified version of the routine is described with respect to FIG. 11 in a case where one of those objects is a BDO. (Of course, data.dump could be called directly on a BDO; however, this isn't typically needed as the BDO is already stored as binary data.) In step 902, the routine instantiates a new bdFrame object and points it to the blob. In one embodiment, the blob is stored in the .dbf file in the BDO directory (see FIG. 4). In step 903, the routine creates a bdPackedObject instance and points it to the newly created bdFrame (which points to the blob) and stores any other desired packing information. The routine then returns an indicator to the populated bdPackedObject.

Figure 10:
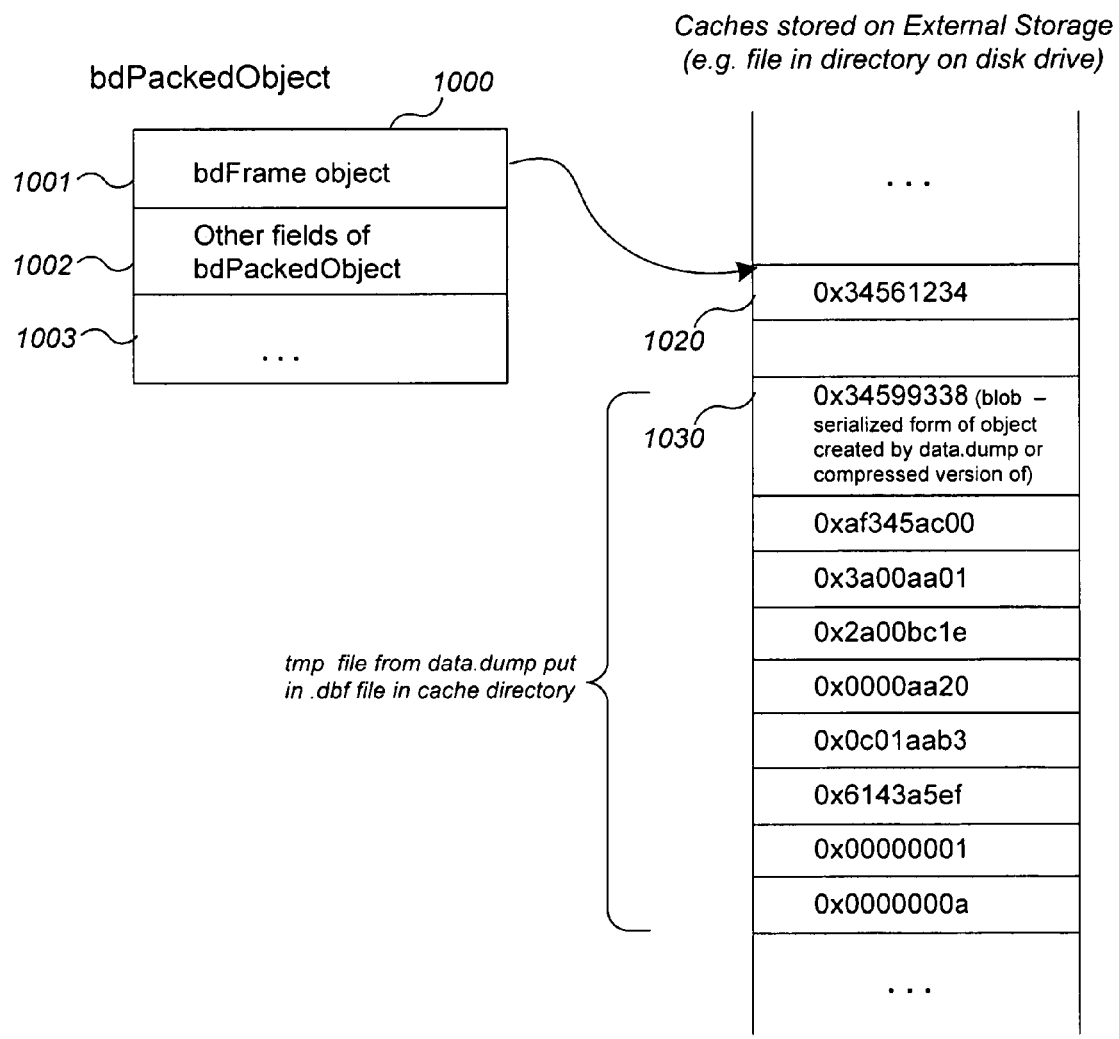
FIG. 10 is an example block diagram showing the structure of a big data packed object.

FIG. 10 is an example block diagram showing the structure of a big data packed object. The bdPackedObject structure 200 is an example data structure created by the routine described with respect to FIG. 9. The bdPackedObject structure 200 comprises a bdFrame object 1001, which points to the data cache object 1020 stored on an external medium. This data cache has, for example, a single item, since the serialized data is actually resident in the related blob file 1030 (<base>.dbf. The data cache file 1020 is used to set up the data structures so that the blob file can be accessed using the normal BDO processing. The bdPackedObject 200 also shows that other data can be stored in other fields 1002 and 1003.

FIG. 11 is an example flow diagram of an example routine for serializing an S-PLUS object that is a big data object to be compatible with other types of serialized S-PLUS objects. The routine of FIG. 11 is a modified version of the data.dump routine described above with respect to FIG. 9. In step 1101, the routine determines whether the designated S-object (as designated through, for example, an input parameter) is a BDO. If so, the routine continues in step 1103, else continues in step 1102. In step 1102, the routine performs the "normal" serialization process on non-BDO S-objects, walking the object tree and collecting the representative ascii data as output to a temporary file. In the process of this normal data.dump processing, note that it is possible to invoke the routine of FIG. 11 with a BDO, if, for example, the S-object contains a BDO as one of its elements.

In step 1103, the routine after determining that the designated object is a BDO, determines each of the related files (e.g., the three corresponding cache files) for the BDO. In steps 1104-1106, the routine loops on each of the related files to serialize them. In particular, in step 1104, the routine retrieves the next related file. In step 1105, the routine determines whether it has processed all of the files, and, if so, continues in step 1107 (out of the loop), otherwise continues in step 1106. In step 1106, the routine compresses the current file into a format "compatible" with the serialization of the standard data.dump routine. In one embodiment, the routine uses base 64 encoding to store the data in the file as ascii strings, inserting proper information that identifies the data as BDO related data. The routine then returns to the beginning of the loop in step 1104. After the loop finishes, in step 1107, the routine streams the encoded data into a designated text file, and then returns.

As previously mentioned, users can define their own data handling routines for BDOs. The primary mechanism for doing this is through a function called "bd.block.apply," which allows the user to process a block of data at a time, performing the designated function on the data. This function may be used to transform the data, such as by adding new columns, aggregating data etc. When applied with some forethought, many transformations to the data can be performed in one data pass—especially in combination with the "bd.create.columns" command, which allows a user to add columns.

Two different examples of bd.block.apply are demonstrated in FIGS. 12 and 13. FIG. 12 is example pseudo code and execution results for a user defined function that processes big data in blocks to perform a transformation on data. Recall that the variable "big" has already been defined and was set to a BDO containing 60 rows, with 5 columns, 1 of which is a factor. Display 1201 shows the contents of an S-PLUS script object "Example1.ssc," which contains S-PLUS code for adding a column with the weight of each row multiplied by two (see line 1204). Line 1202 assigns the weight of the current input row to a variable "x." Line 1203 prints out the weight values as they are processed. In line 1204, the new data frame with the added column is returned from the user-defined function.

Area 1220 shows the contents of the Command Window used to invoke this row-based function on our BDO "big," which contains the car data. The first line invokes the function using the bd.block.apply call "bd.block.apply(big, bdBlockExample1). Results 1221 are caused by Line 1203 of the script. The data frame returned with the new column 1222 is shown next—the result of the execution of the command. Note that behind the scenes, the BDOLS is invoking a pipeline engine (a node of it) to perform the row by row processing. This is explained further below with respect to FIG. 22.

FIG. 13 is example pseudo code and execution results for a user defined function that processes big data in blocks to perform a different transformation on data. This time the block size is change to show and output statements have been added to demonstrate that the function is truly processing block by block. Specifically, in FIG. 13, display area 1301 contains a new script for the function bdBlockExample3. Note also, that in line 1302, the user has changed the block size to 25 rows. Since the data set is 60 rows, it should be processed in 3 chunks. Lines 1303 and 1305 correspond to the similar code in FIG. 12. Line 1304 is a different output line, which prints out the values for the Weight column before processing them. Display area 1320 shows the results of executing the "bd.block.apply" function with this new script on the same "big" variable. As can be observed, there are 3 chunks of output printed in Area 1321. However, the same new data frame with added column 1322 is returned.

As mentioned with respect to FIG. 1, once the user has imported data and created all of the various objects as described above, the user likely desires to preprocess, manipulate, and view the data. Specific functions in an example embodiment for processing and manipulating the data using S-PLUS are described in a separate section.

The example embodiment provides a great many ways to view and present BDOs. In a simple case, a "print" command can be used. When the exemplary print command is invoked on a BDO, it "does the correct thing"—that is, it prints a summary of the data, typically by printing a specific number of rows. The default settings can be adjusted through an options command (bd.options). By default, as shown in Table 1 below, 5 rows are printed. Table 1 is print output from invoking the print command on the example variable "big" described earlier. The sample data has 60 rows with 5 columns. The last column is a categorical variable that describes (5) types of cars. The first four columns are weight, (a measure of engine) displacement, miles per gallon, and fuel consumption (miles/gallon divided by 100). The default shortened display prevents accidental printing of a large number of pages.

TABLE 1

>print(big)
bdFrame: 60 rows, 5 columns

|   | Weight | Disp. | Mileage | Fuel | Type |
|---|--------|-------|---------|------|------|
| 1 | 2560 | 97 | 33 | 3.030303 | Small |
| 2 | 2345 | 114 | 33 | 3.030303 | Small |
| 3 | 1845 | 81 | 37 | 2.702703 | Small |
| 4 | 2260 | 91 | 32 | 3.125000 | Small |
| 5 | 2440 | 113 | 32 | 3.125000 | Small |

...55morerows...
>

Figure 14A:
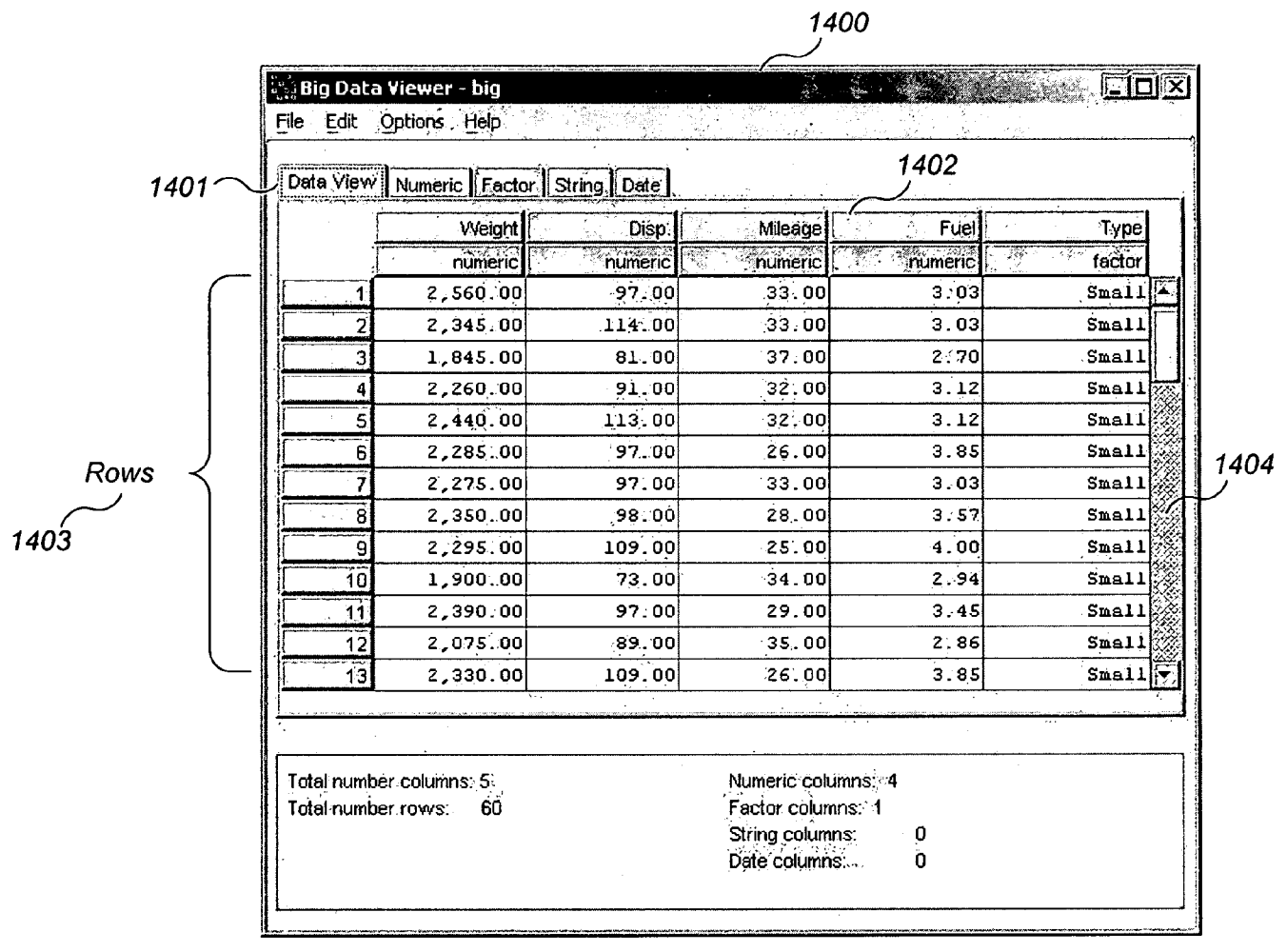
Figure 14B:
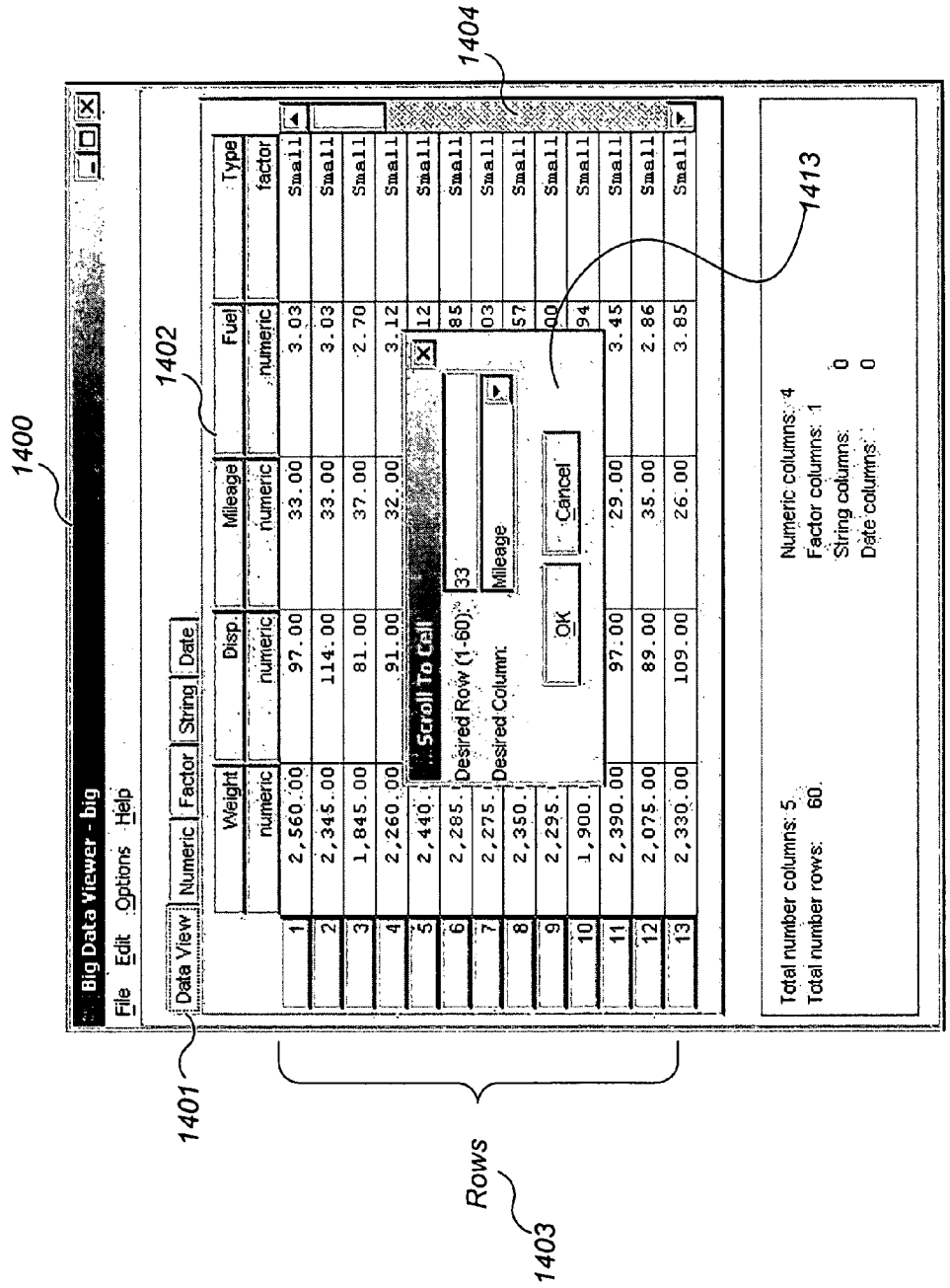
Figure 14D:
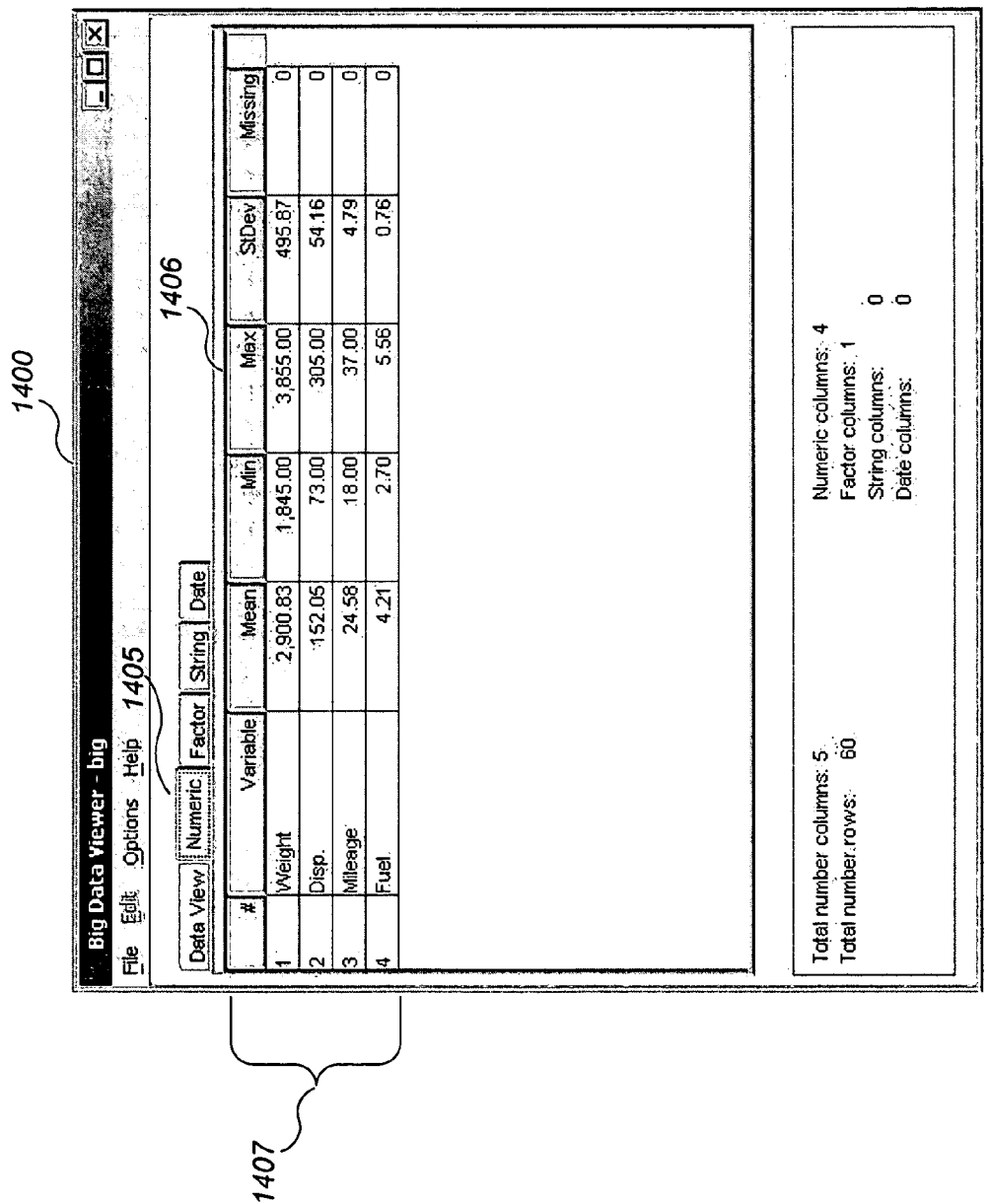

In addition to simple printing, the BDOL supports a graphical user interface (GUI) for viewing BDOs. FIGS. 14A-14E are example screen displays for a data viewer that supports viewing a big data object. Other GUIs and other viewing applications can be incorporated and may use similar techniques to those demonstrated in FIGS. 14A-14E. In FIG. 14A, the screen display 1400 is currently presenting a view of the data as a whole, as show by the Data View tab 1401. As many rows 1403 that will fit within the current window are displayed, with a scrollbar 1404 available to permit access to other rows. To support this GUI, the data from the cache is of course read in by block (window or by row). In this view, all of the values for as many columns 1402 as can be displayed are shown. In additional scroll bar is presented (not shown) if more columns than fit are available. FIG. 14B illustrates that a user can navigate to a specific set of rows or columns via dialog 1413. FIG. 14C shows the resulting view after scrolling using dialog 1413. A different set of rows 1414 is now displayed.

Figure 14E:
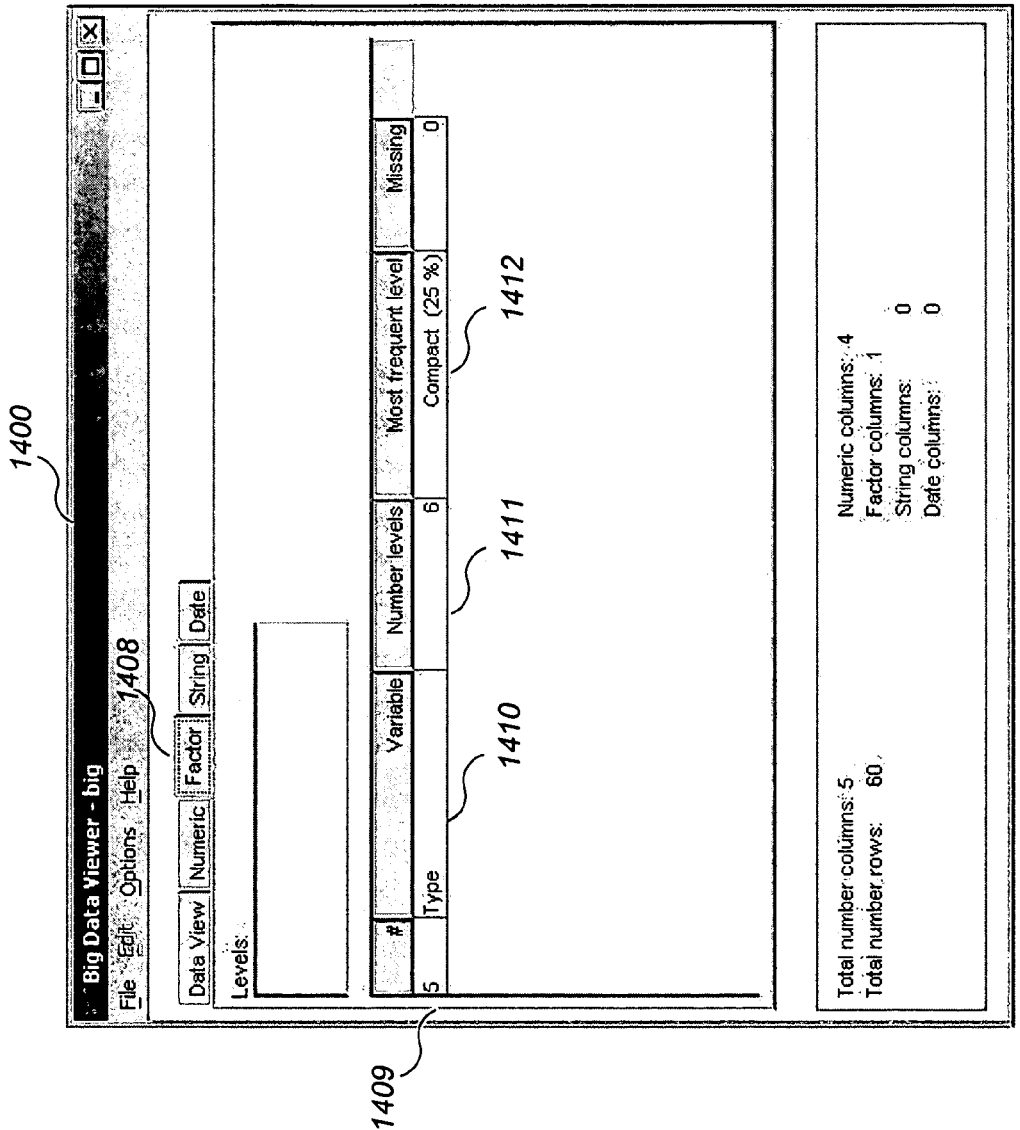

FIG. 14E shows another view of the BDO selected through the numeric tab 1405. In this case, the summary values for all columns of the numeric type 1407 are displayed in subwindow 1406. FIG. 14F shows summary information regarding all columns that are factors (have categorical values). In this case, information for the "type" variable 1410 of the car data 1409 is displayed in the subwindow selected using factor tab 1408. The number of levels (categories) 1411 and the most frequent occurring level 1412 (based upon the summary count stored in the metadata) is displayed.

In addition to printing and viewing, the BDOL supports a large variety of graphics and charting functions that also work on BDOs. Several of such functions have been enhanced to automatically chart or graph BDOs using hexagonal binning techniques instead of scatter plots. This avoids a problem of so many dots appearing on the screen (1 per value) that the data view stops being informative. Hexagonal binning is a process by which data is grouped into bins (or buckets), and then a hexagon, instead of a square is displayed to represent the data (as a group) that falls into a particular bin. The hexagonal shape is believed to provide less perturbation to how the data is perceived. In the embodiment of hexagonal binning used, the count of data corresponding to a bin is further encoded using some emphasis to represent the corresponding quantity of points falling into that bin. For example, the different hexagons may be color coded to represents the different amounts.

Figure 15A:
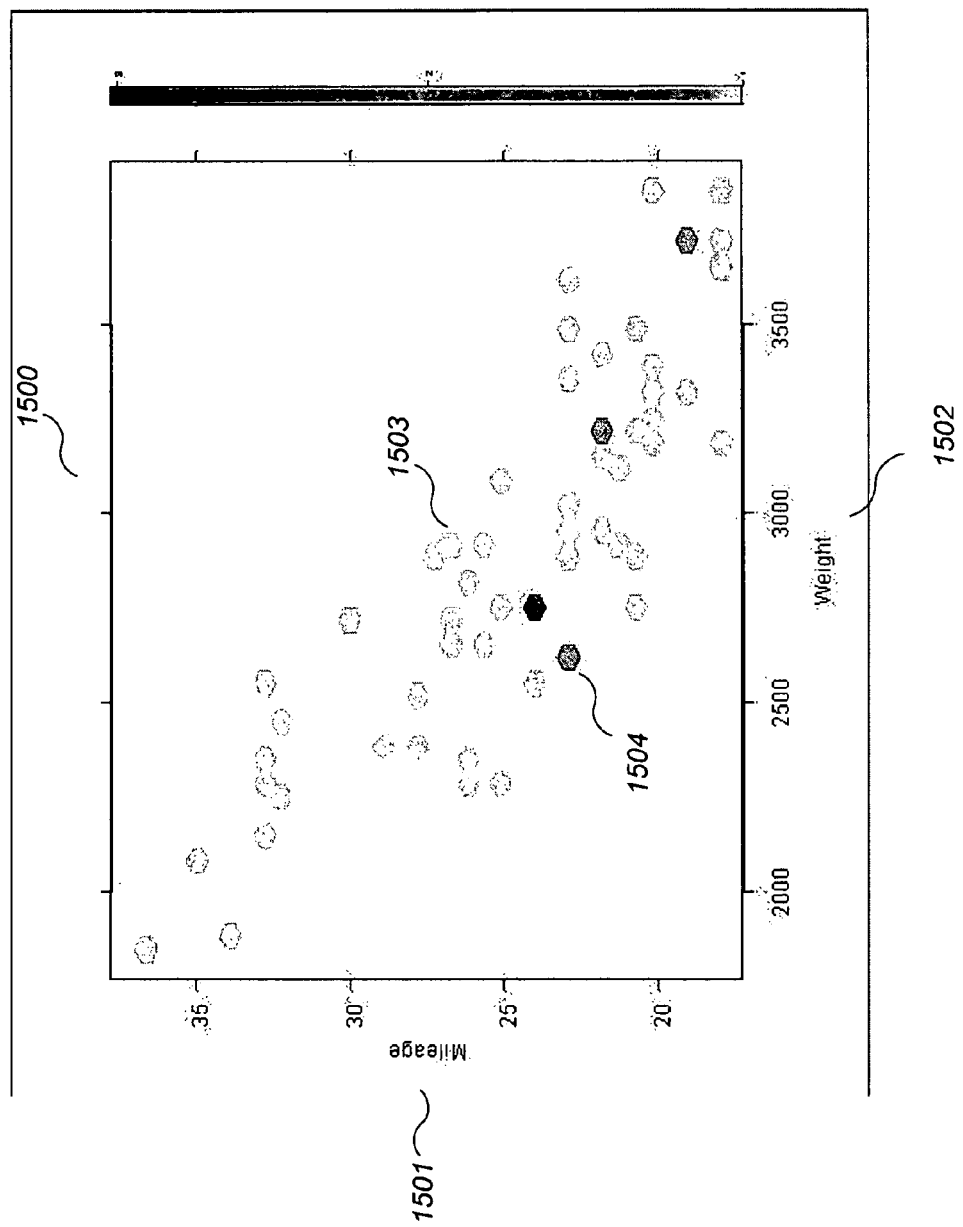
FIGS. 15A, 15B, and 16 are example screen displays of plotting two variables of big data objects using hexagonal binning techniques.
Figure 15B:
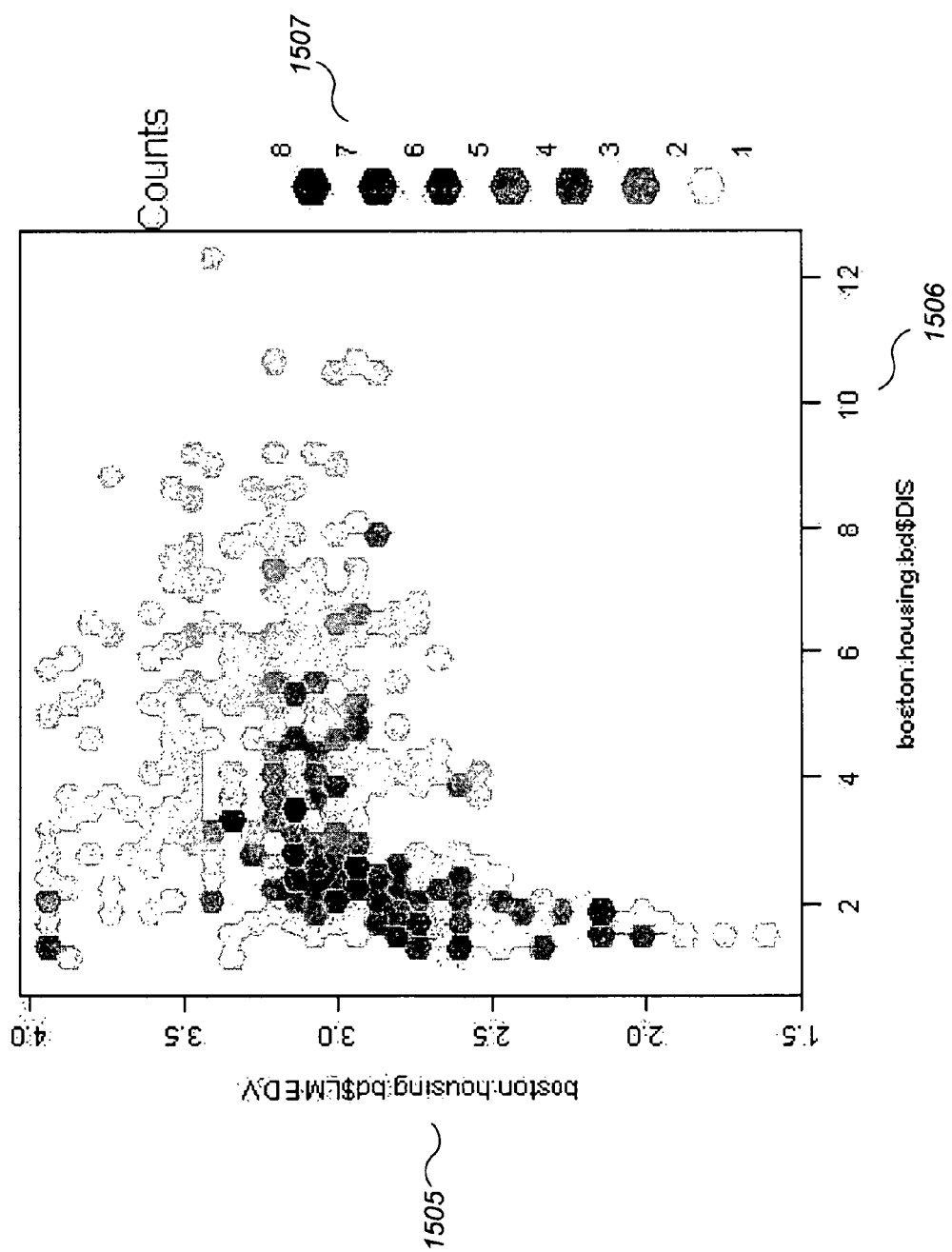
Figure 16:
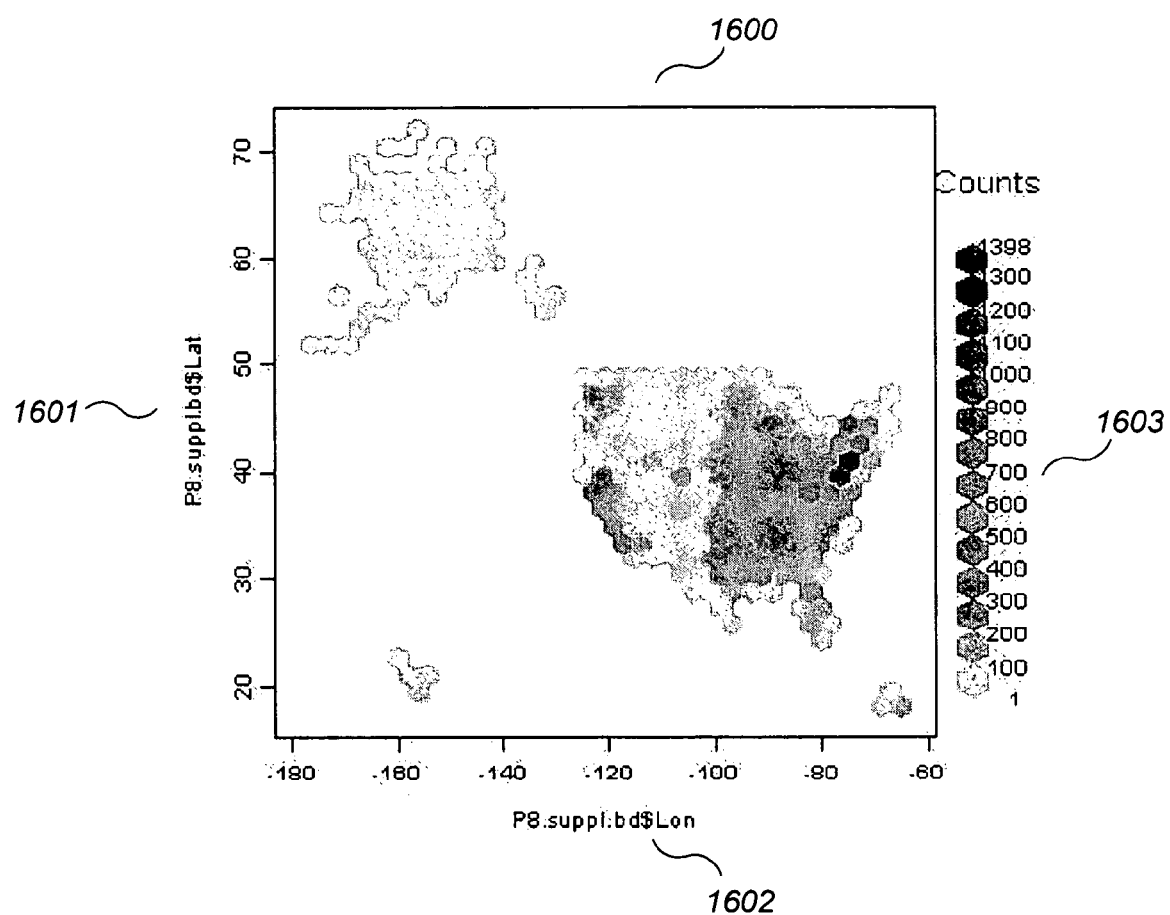

FIG. 15A, 15B, and 16 are example screen displays of plotting two variables of big data objects using hexagonal binning techniques. FIG. 15A is a hexagonal binning plot 1500 provided to show the "big" variable (fuel.frame sample data) binned by plotting mileage 1501 against weight 1502. Although it is difficult to see the data, one can observe from points such as 1504 and 1503 that most of the cars surveyed weigh around 2500 lbs and only get about 24 mpg. Note that the quantity range isn't reflected well in this particular data set.

FIG. 15B is another hexagonal binning plot on a different set of data to better illustrate how hexagonal binning may show data trends. The particular data set is another example shipped with the BDOLS. Note that a different scale and key to the bins, scale 1507, is provided which shows the bins as more discrete colors.

FIG. 16 is another example of hexagonal binning used to show how various zip codes fall within locations in the country. On can observe very quick from the plot 1600 that a majority of the zip codes are located in the Northeast.

Figure 17:
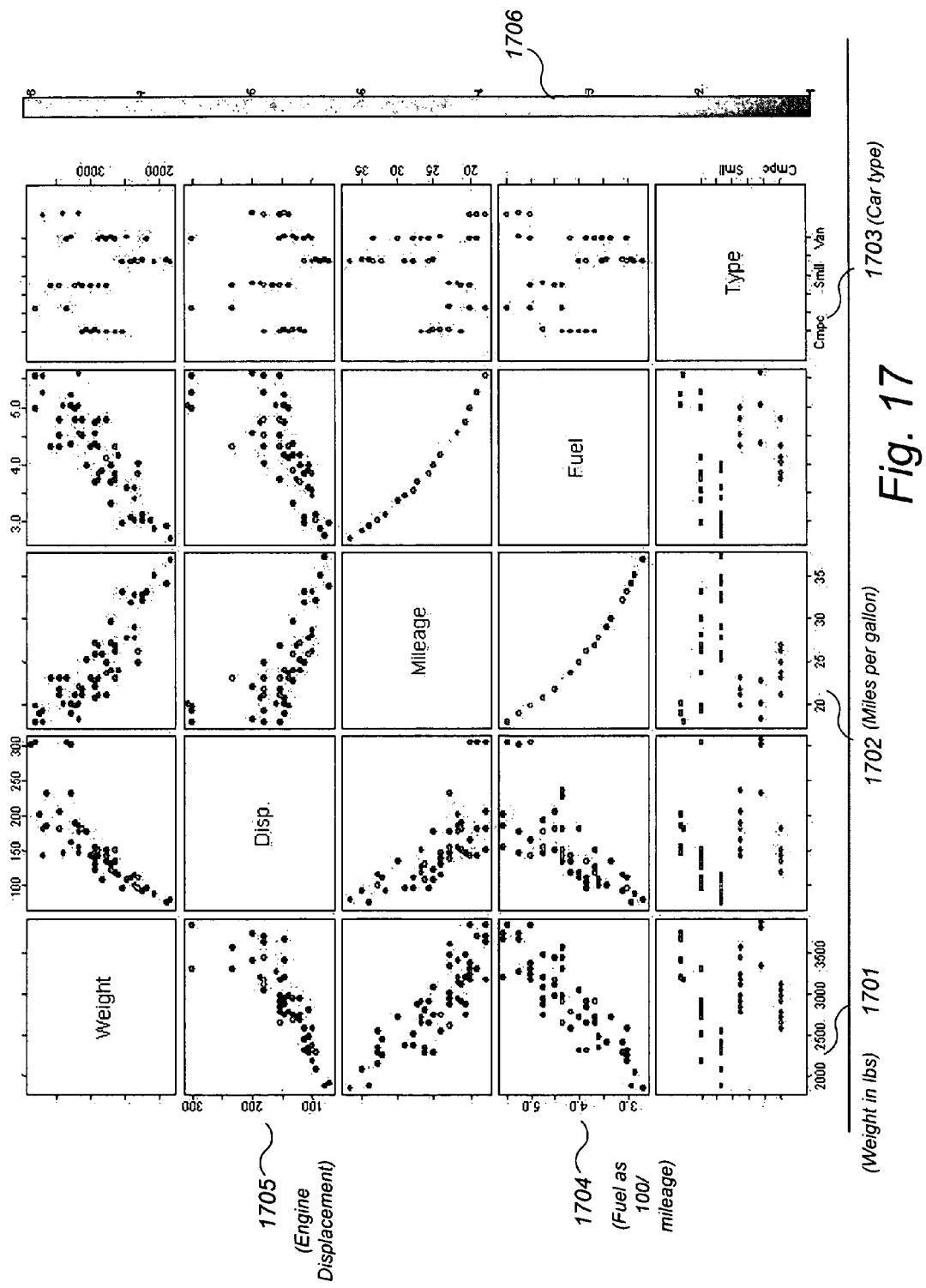
FIG. 17 is an example screen display of plotting all pairs of a multi-dimensional big data object using hexagonal binning techniques.

Hexagonal binning techniques for charting big data can also be combined with many of the other graphing and charting functions. For example, all of the pairwise combinations of variables in a BDO can be plotted so that a user can quickly identify trends for more study and modeling. Note again that, since big data objects are being displayed, the BDOL automatically plots the data using hexagonal binning techniques to avoid noise. FIG. 17 is an example screen display of plotting all pairs of a multi-dimensional big data object using hexagonal binning techniques. In this example, the car data in variable "big" is once again displayed. This time, the values of each of the variables 1701-1705 is plotted on an axis against every other variable. Particular trends, such as a positive linear relationship between fuel 1704 and weigh 1701 can be observed.

Trellis graphics is another technique for charting data. According to this technique, the values of one variable is plotted against the values of another, but this time in conjunction with values of a third variable, called a conditioning variable. There is a separate window provide for each combination of the first two variables as they related to a value (or range of values) of the conditioning variable. When used with BDOs, the BDOL automatically plots the data in a trellis plot using hexagonal binning techniques which provides a very efficient mechanism for identifying variables that are causing biggest changes in the data sample.

Figure 18:
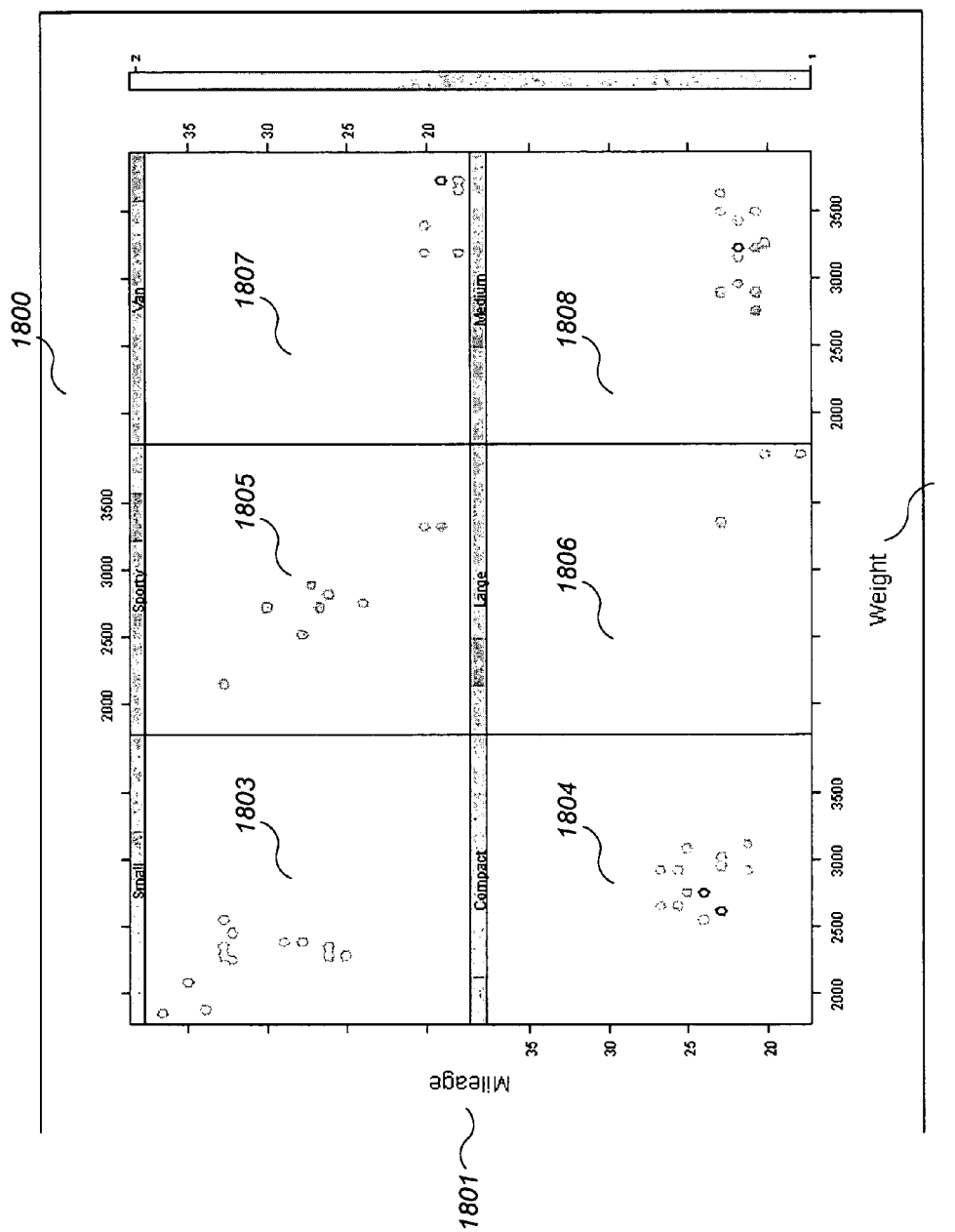
FIG. 18 is an example screen display of a trellis plot of a big data object using hexagonal binning.

FIG. 18 is an example screen display of a trellis plot of a big data object using hexagonal binning. Trellis plot 1800 contains six windows 1803-1808 which plot a first variable (mileage) 1801 against values of a second variable (weight) 1802. The sub plots 1803-1808 show how mileage compares to weight for the different "types" of vehicles in the demonstration car data sample. In particular, note that each window 1803-1808 shows the mileage and weight points of interest as they relate to the levels (categories) of the types of cars: small, compact, large, etc. One can observe from this plot what one might expect—smaller cars, which generally weigh less, get more miles per gallon.

Figure 19:
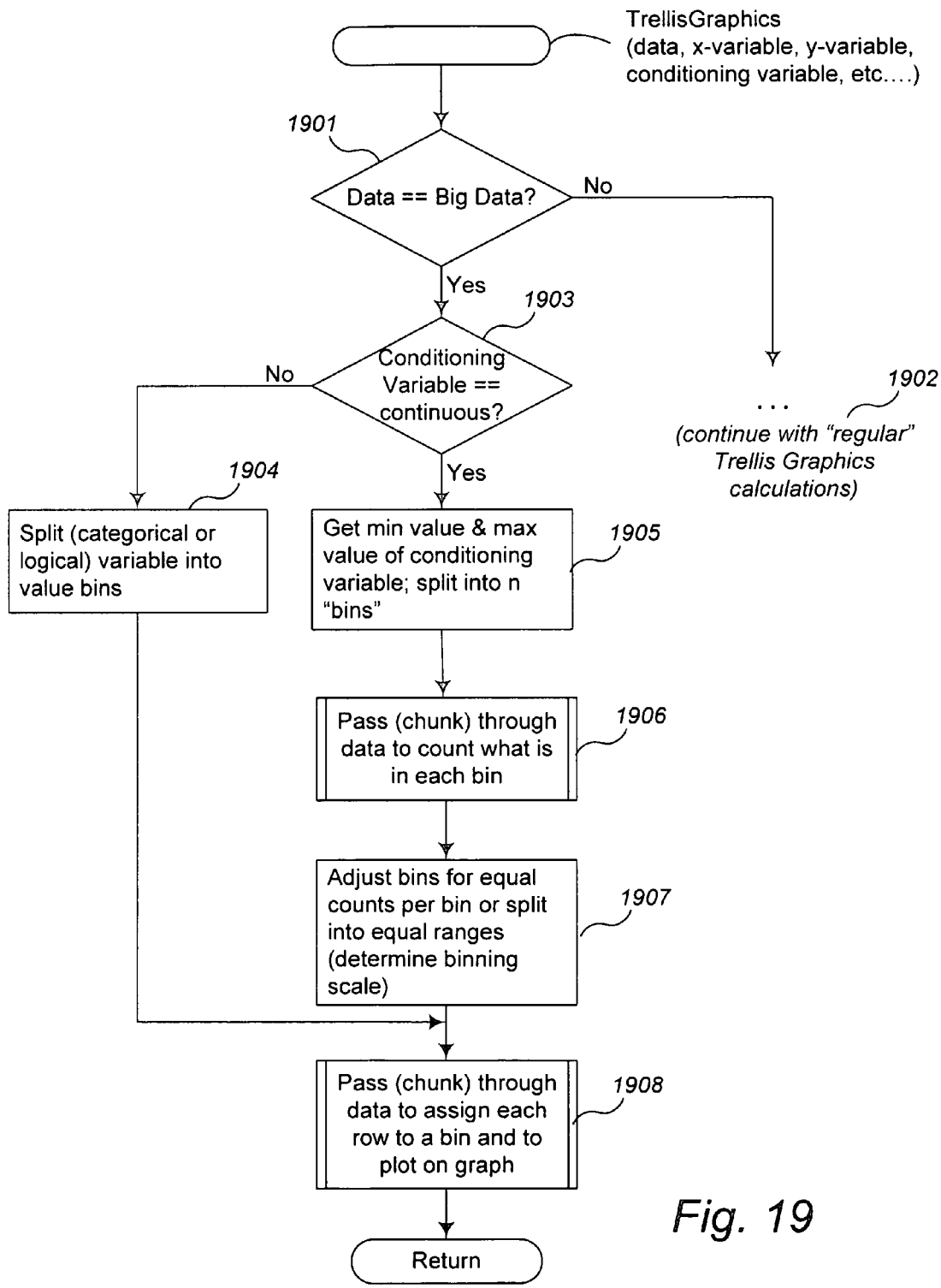
FIG. 19 is an example flow diagram of a (portion of a) routine for creating a trellis plot of a big data object using hexagonal binning.

Providing trellis plots for BDOs is a non-trivial task, primarily because it isn't necessarily apparent how to group the data into bins before reading all of the data. Since the data is (presumably) really large, a goal of the BDOL support is to minimize passes through the data. FIG. 19 is an example flow diagram of a (portion of a) routine for creating a trellis plot of a big data object using hexagonal binning. This routine is optimized to use a single pass through the data to determine the bins or ranges for each bin. More specifically, depending upon the circumstances, a user may desire the data to divide into an equal number of bins based upon the total range of the data values. For example, if the data values of a particular variable being plotted ranges from 1-1000 and 10 bins are desired, then each bin could indicate a range of 100, e.g., 1-99, 100-199, etc. up to 10 bins. Alternatively, the user may desire that the data values fall equally into the bins—that is the bin ranges are chosen based upon where the data values fall, so that each bin represents the same number of data points. Thus, the ranges for the bins may well depend upon the data values. In FIG. 19, heuristics are employed with continuous conditioning variables that take notice that only so many bins can be displayed on the screen anyway, so it uses that information to initially decide the bins.

Specifically, in step 1901, the routine first determines whether the designated data to plot is a BOD, and, if so, continues in step 1903, otherwise uses the "normal" Trellis graphics routines 1902 provided with the system (in this case S-PLUS). In Step 1903, the routine determines whether the conditioning variable is continuous, and if so, continues in step 1905, otherwise continues in step 1904. In step 1904, the routine splits the categorical variable into bins, which correspond to each level (or logical value) and continues in step 1908. In step 1905, the routine uses the BDO metadata information for the variable (column) that represents the conditioning variable and splits it into "n" initial bins. For example, one might use 1000 bins if it can be determined that 1000 bins is about the maximum that can be observed. This number could be configurable. In step 1906, the routine retrieves and examines the rows of each block of data to count what would fall into the initial bins. In step 1907, the routine then determines a binning scale by adjusting the bins for equal counts per bin or into equal ranges, depending upon what is designated by the user. In step 1908, the routine runs a second pass through the data to assign each row to the bins of the determined binning scale, and plots the binned data on a graph.

Figure 20:
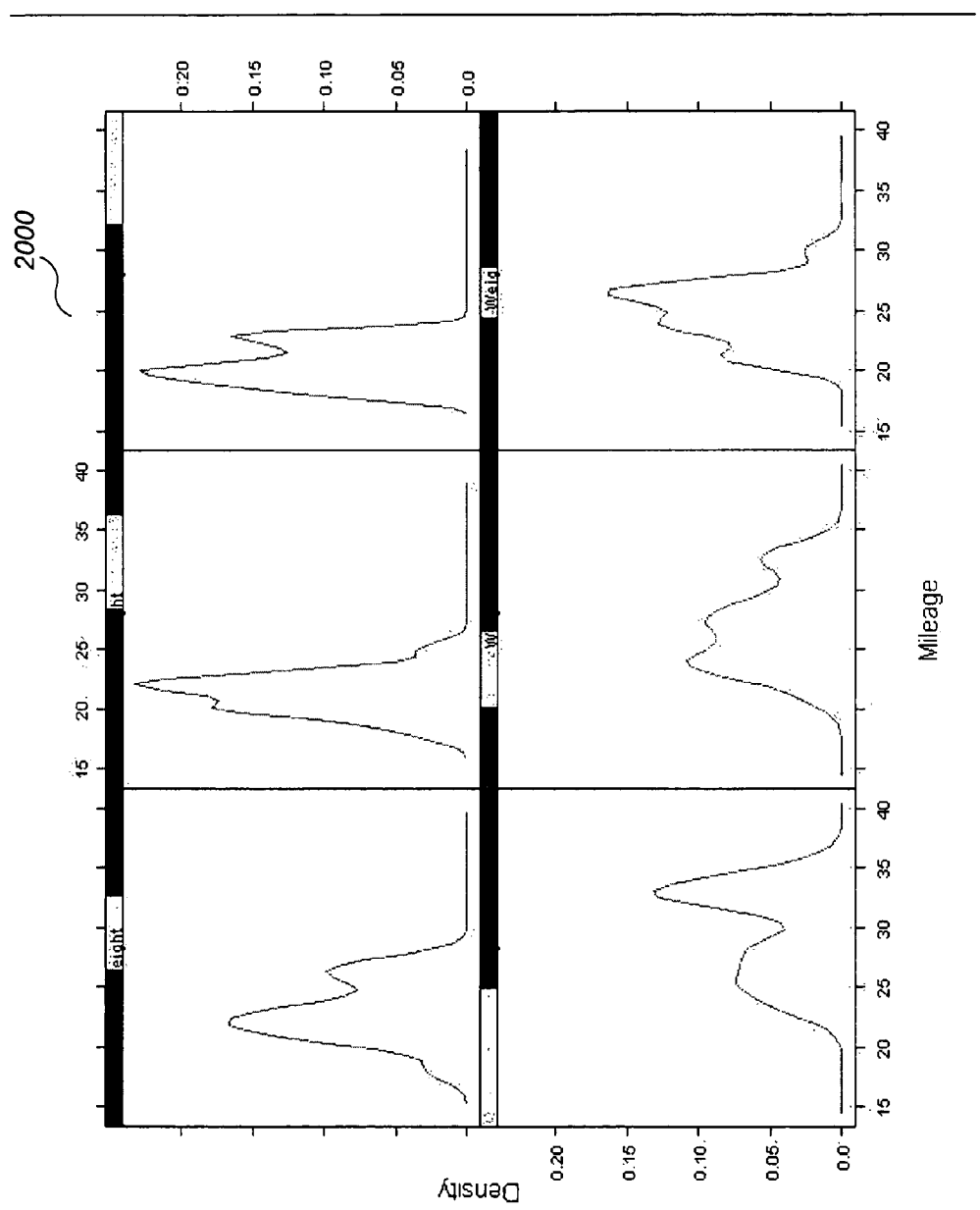
FIG. 20 is an example screen display of a density plot of a big data object.
Figure 21:
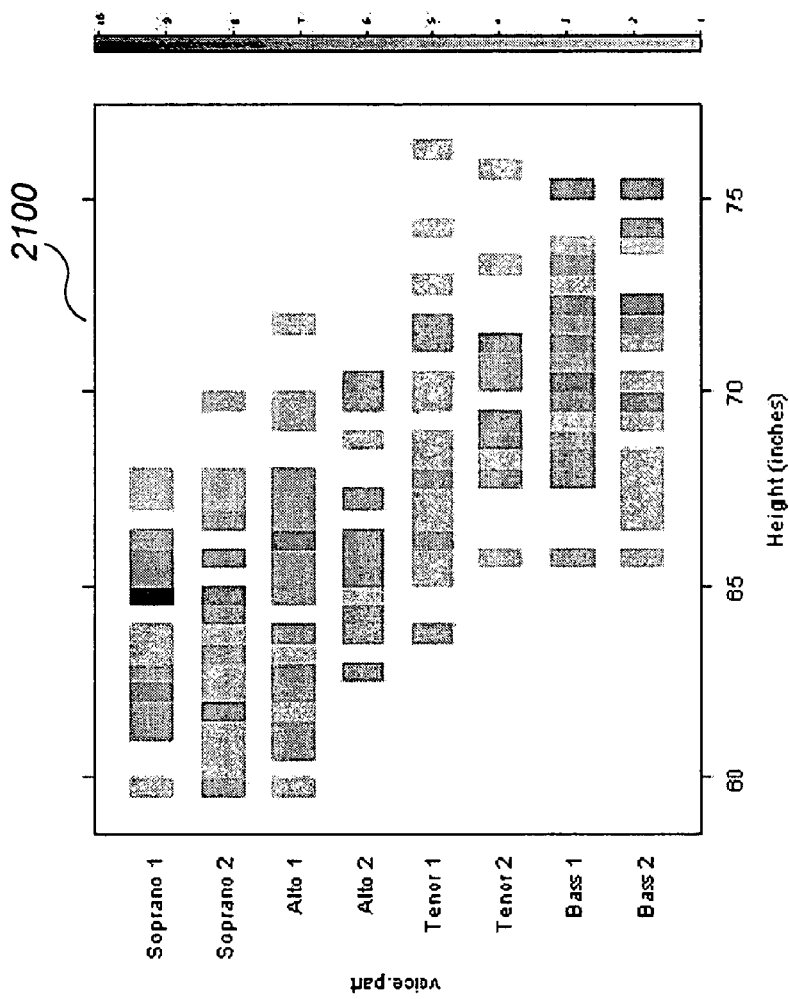
FIG. 21 is an example screen display of an intensity plot of a big data object.

There are many more types of charts and plots that can be used to visualize BDOs. FIGS. 20 and 21 represent just two of these. FIG. 20 is an example screen display of a density plot of a big data object. This plot shows the likelihood that data will fall into particular value ranges based upon the data in the set. FIG. 21 is an example screen display of an intensity plot of a big data object. Other plots and charts are available.

FIGS. 22 and 23A-23I describe the use of a pipeline architecture to support BDO object types in a statistical language. In an example BDOLS, support for BDOs is provided through the use of a pipeline engine and architecture. Although there are a multitude of ways to implement a pipeline, conceptually, the pipeline engine processes the out-of-memory data in "chunks"—foregoing the need to see the data all at once. In some embodiments, the pipeline architecture supports building statistical "workflows" with a plurality of nodes that can act on or otherwise transform the data. Each node (which may map to one or more statistical or transformational operations) accommodates out-of-memory data. Data is processed and passed from one node to the next. Generally speaking, the data is processed in chunks, whose size can be configured. In one embodiment, a chunk size is typically 10,000 rows.

Two different approaches (or a mixture thereof can be used to pipeline the data. For example, some operations require the entire data to be viewed at once (and possibly passed through a number of times)—not just in chunks. In these cases, the data is processed "chunk-at-time" in memory (RAM or virtual memory), the cumulative results stored in another out-of-memory cache, and the memory is released to process a next chunk. This allows the pipeline engine to implement an operation that requires multiple passes of the data if needed. For example, a statistical modeling operation, such as a classification tree, may require multiple passes. This type of processing is used to implement the example BDOLS.

Other types of operations can process data in chunks without regard to other chunks. In some cases, it is possible to implement a degree of parallel (or simultaneous) processing of chunks, where each node (or some portion of the nodes) in a workflow operates on a different chunk of data and passes its resultant chunk in a buffer to the next node in the pipeline. Combinations are also possible where some nodes can process chunks in this manner and other nodes process the entire data object before passing it to the next node.

Figure 22:
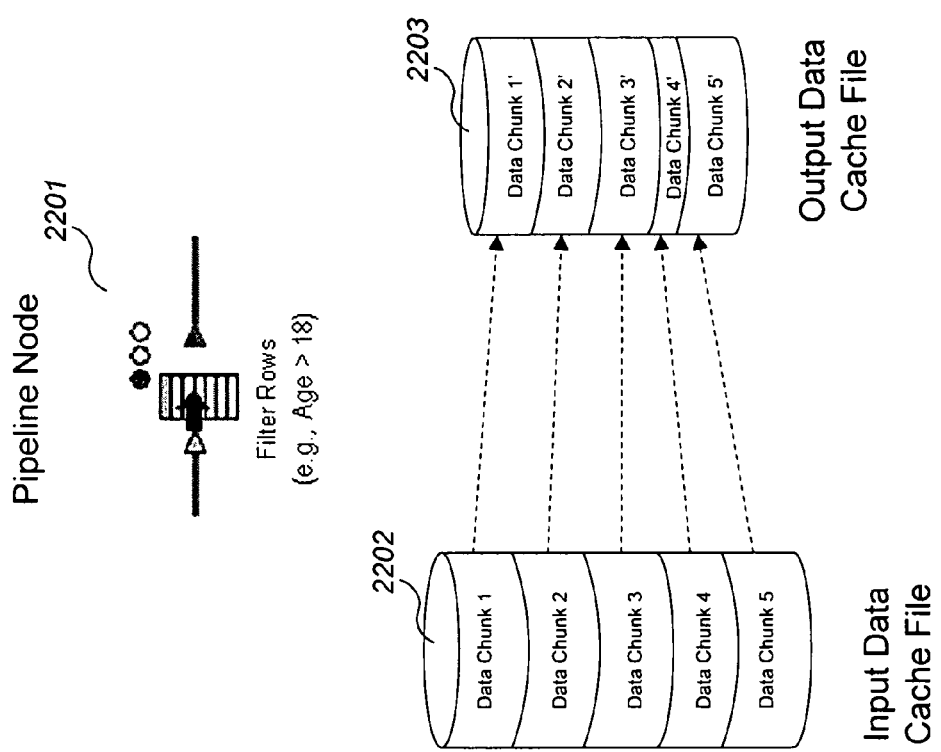
FIG. 22 is an example block diagram of preprocessing a large data set to be analyzed using a pipeline architecture using block processing techniques.

FIG. 22 is an example block diagram of preprocessing a large data set to be analyzed using a pipeline architecture node using block processing techniques. The pipeline node architecture described in FIG. 22, is currently called by the S-Engine to provide BDOL support in the example embodiment of the BDOLS. The node 2201 transforms data (represented by cache 2202) by filtering out only rows of data having a variable "Age" whose value is greater than 18. This node 2201 sequentially reads in a chunk of data from an input data cache file 2202, performs the filter (as specified by, for example, the applicable BDO routine), and outputs the modified chunk (the filtered data) in an output data cache file 2203. The node performs this transformation for each data chunk until Data Chunks 1-6 have been processed.

FIGS. 23A-23I are example block diagrams of an alternative use of a pipelining architecture to perform parallel processing of big data objects. Although the current implementation of BDOLS does not have include routines that take advantage of this capability, it is contemplated that, as appropriate algorithms for processing row-at-a-time data are developed, the processing of the BDOs will lend to greater distributed and parallel processing. More specifically, FIGS. 23A-23I are example block diagrams of a progression of data through a pipeline of nodes in a workflow where parallelism is possible. These diagrams illustrate an alternative use of pipelining wherein a chunk of data is processed by a node, for example node 2302, and passed to another node, for example, node 2303, before the entire input data is processed. This allows for some degree of overlapping processing in architectures and for operations that support a particular node processing a next chunk of data as soon as the previous chunk has been processed.

Figure 23A:
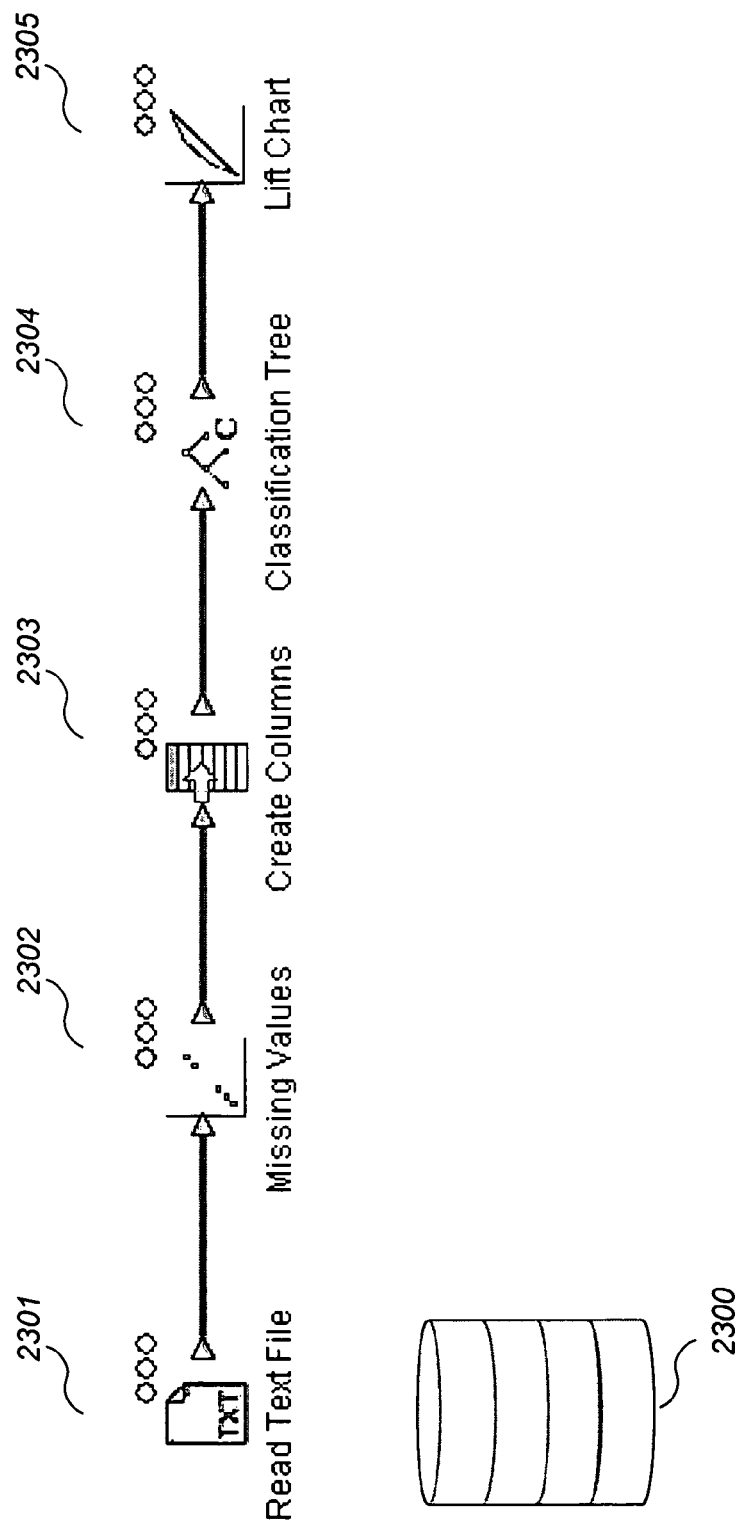
FIGS. 23A-23I are example block diagrams of an alternative use of a pipelining architecture to perform parallel processing of big data objects.
Figure 23B:
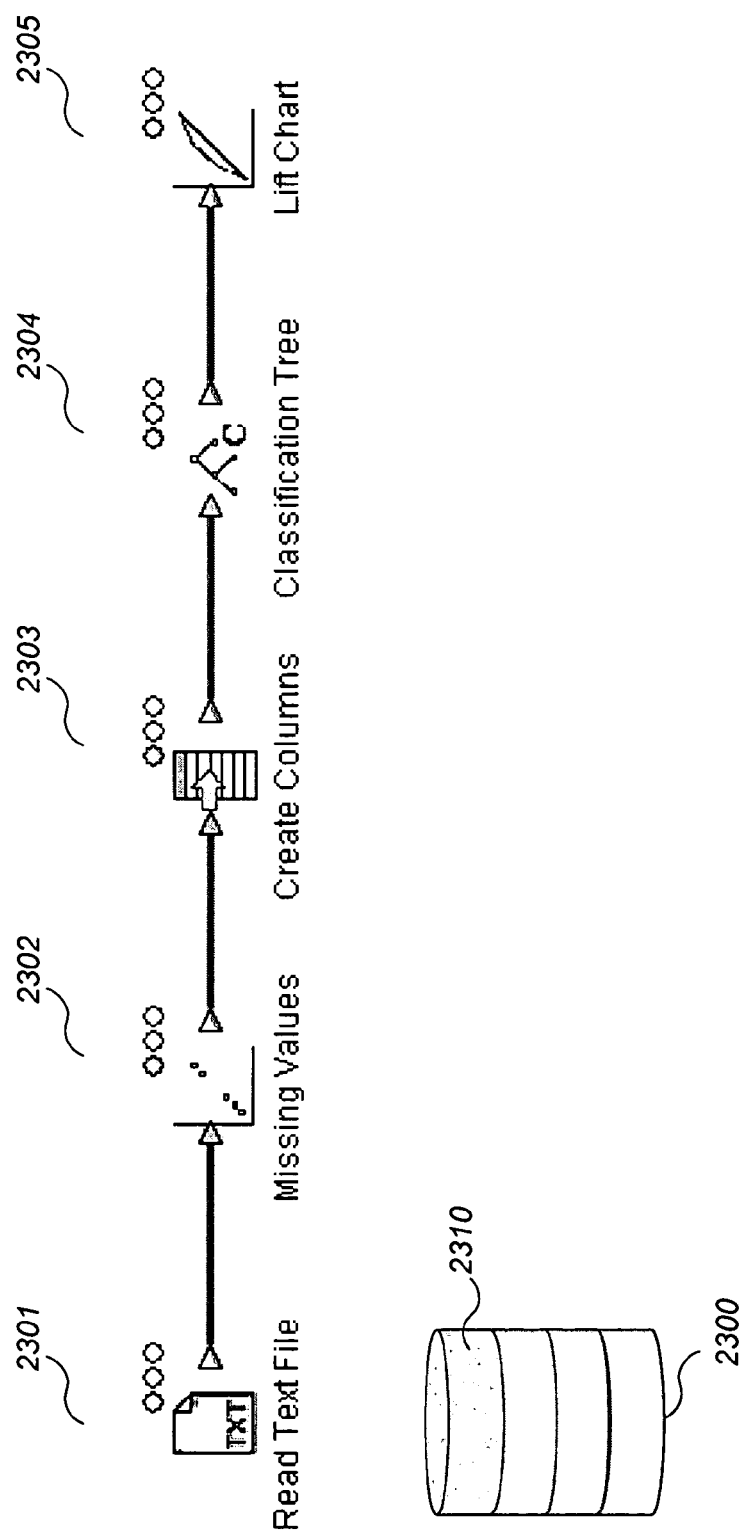
Figure 23C:
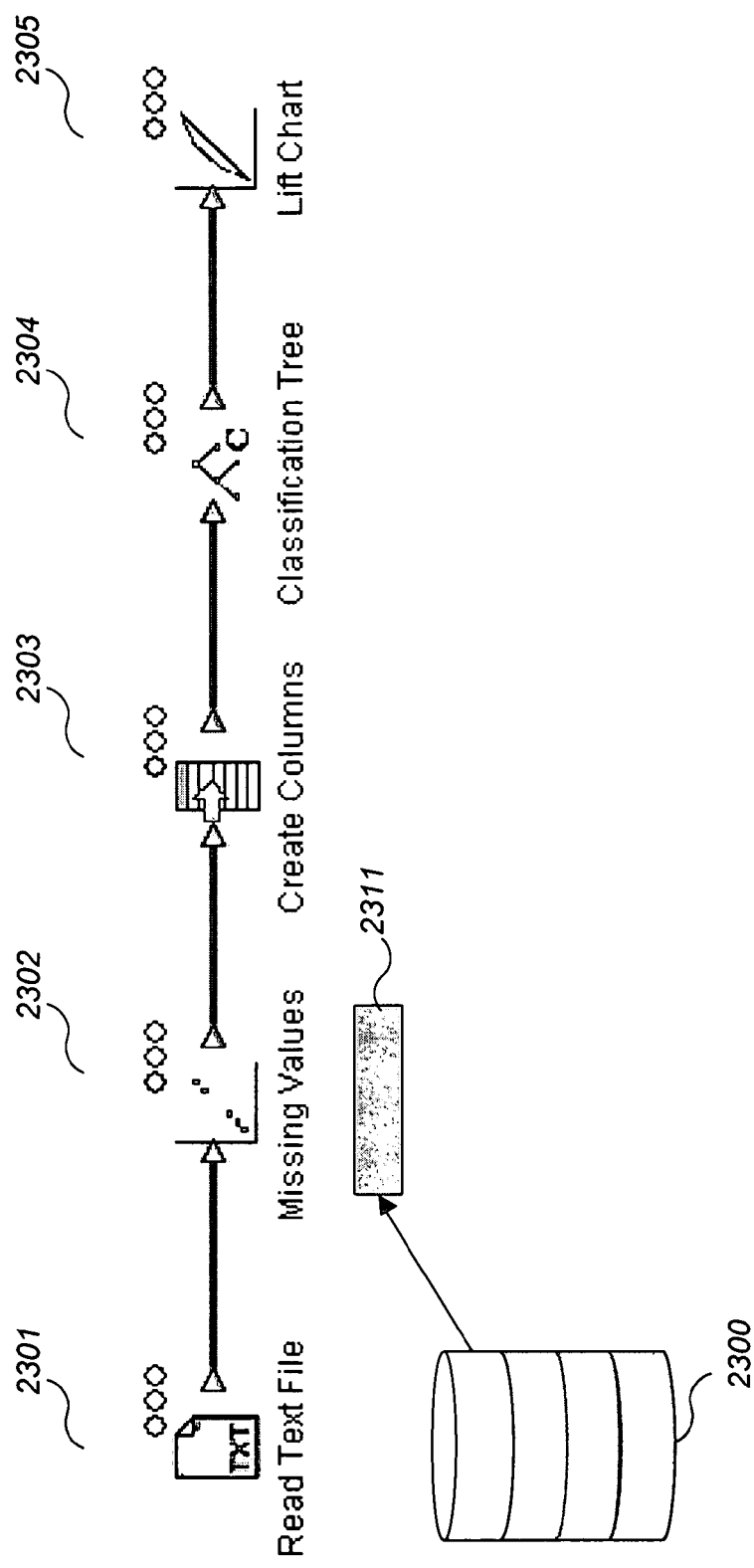
Figure 23D:
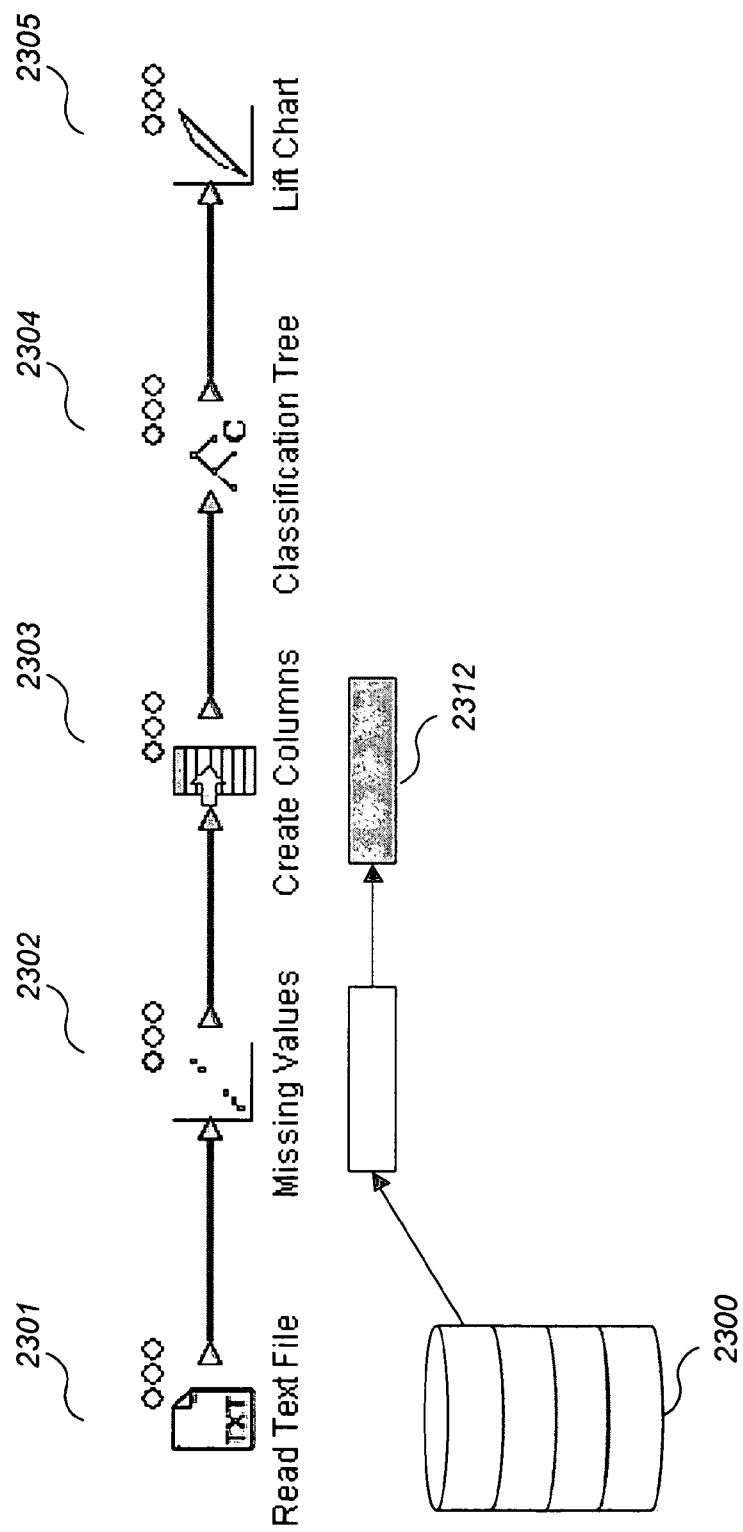
Figure 23E:
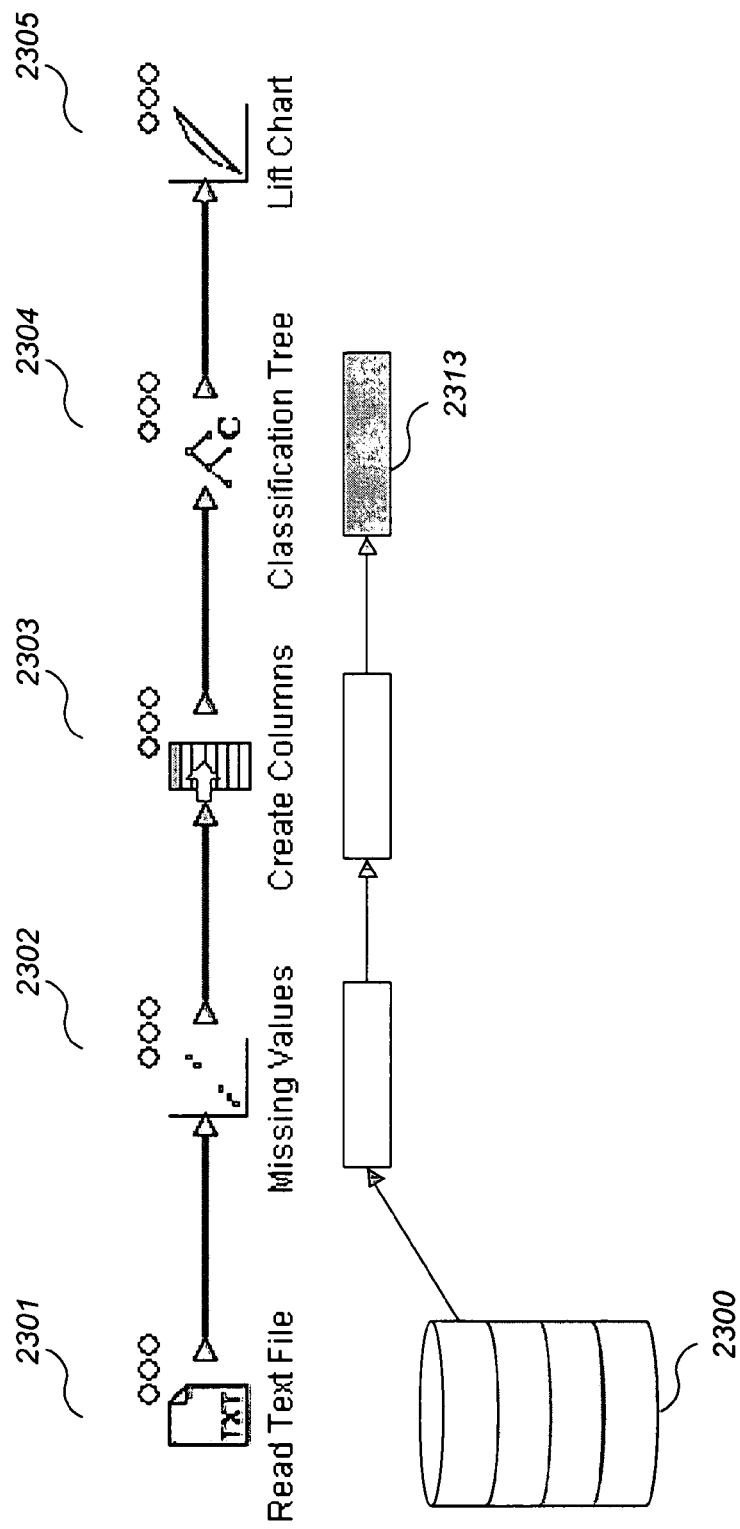
Figure 23F:
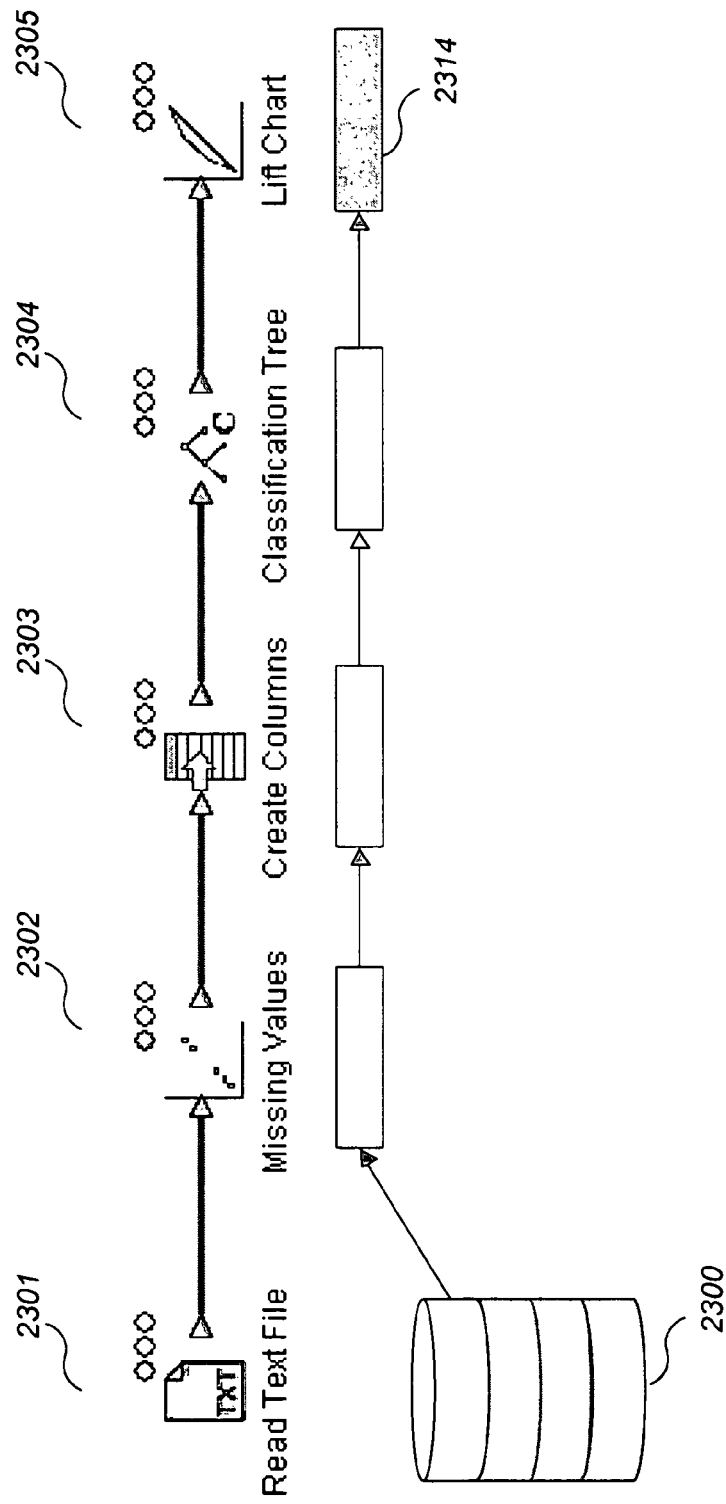

For example, FIG. 23B shows an initial state of the input cache 2300, where the first chunk 2310 is about to be used. In FIG. 23C, this chunk is passed as chunk 2311 to node 2301 for processing to address missing value. The chunk is output in FIG. 23D as chunk 2312 to the next node in the pipeline, node 2303 where additional columns are created. Next, in FIG. 23E, the data chunk 2313 (with the additional columns) is output and forwarded to node 2304 where the data is modeled as a classification tree. Finally, in FIG. 23F, the modeled data is output as data chunk 2314 and displayed by node 2305 as a lift chart. Note that all of this processing of original data chunk 2310 happened without regard to the rest of the data in the input data cache 2300.

Figure 23G:
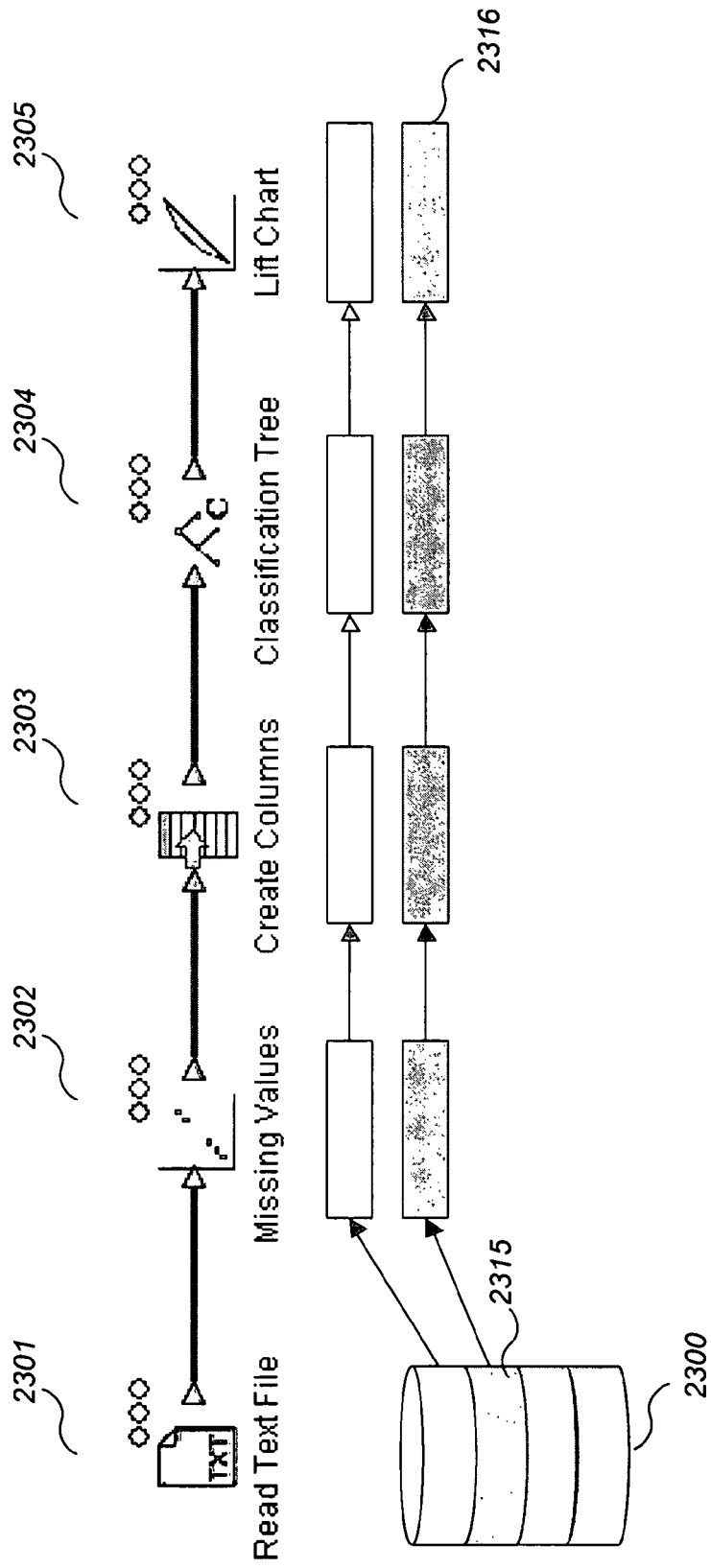
Figure 23H:
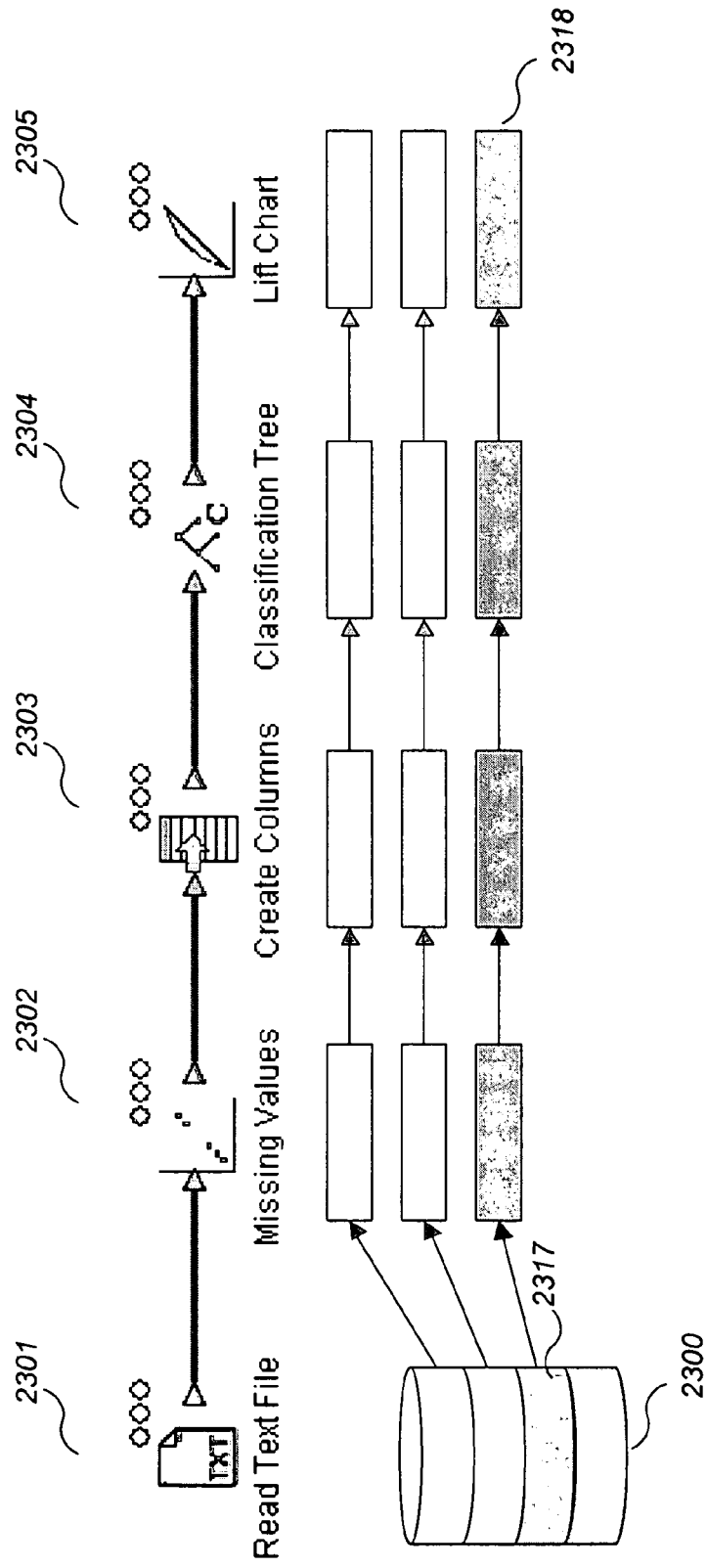
Figure 23I:
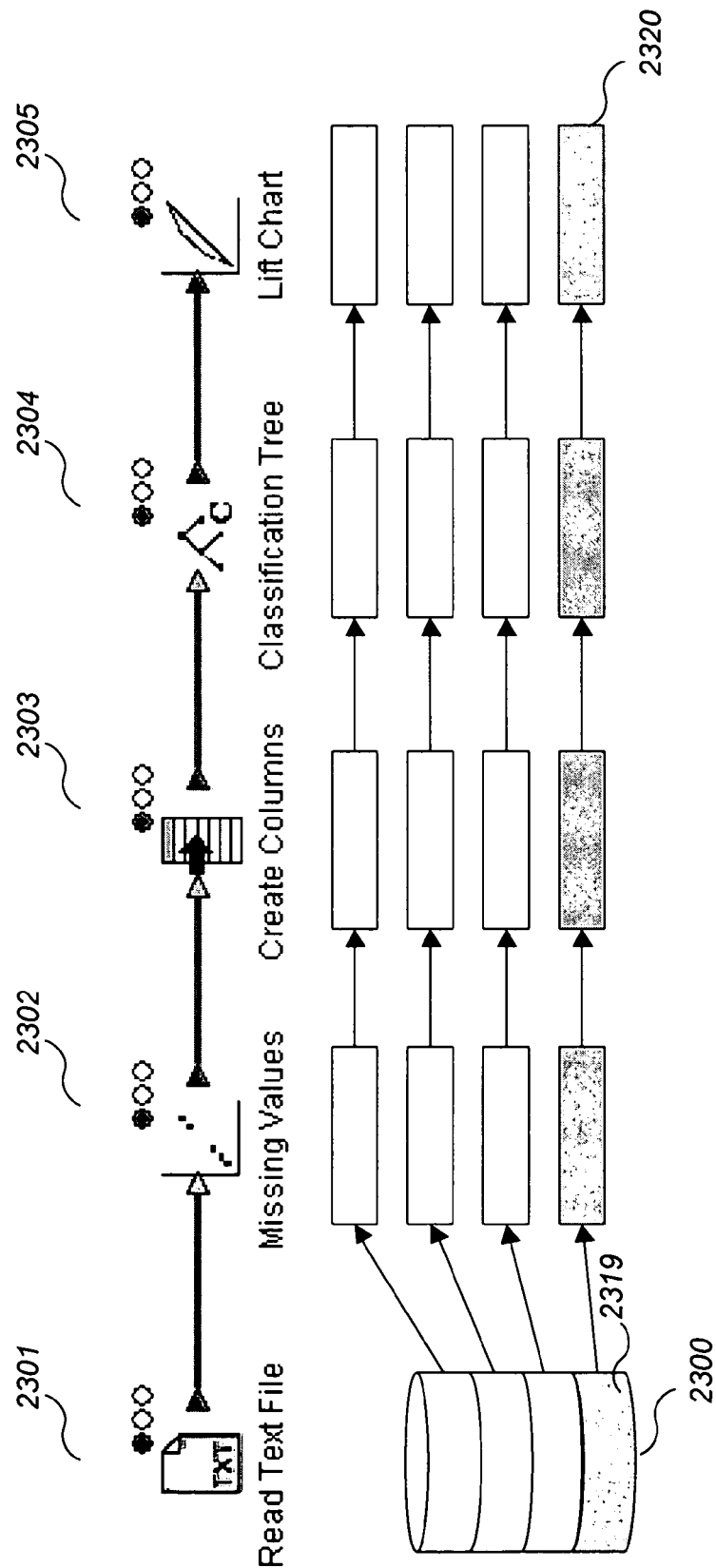

The remaining figures of this series show the rest of the input cache data 2300 being processed similarly. In FIG. 23G, the second input chunk 2315 is processed and eventually charted as output data chunk 2316. In FIG. 23H, the third input chunk 2317 is processed and eventually charted as output data chunk 2318. SG, In FIG. 23I, the final input chunk 2319 is processed and eventually charted as output data chunk 2320.

Figure 24:
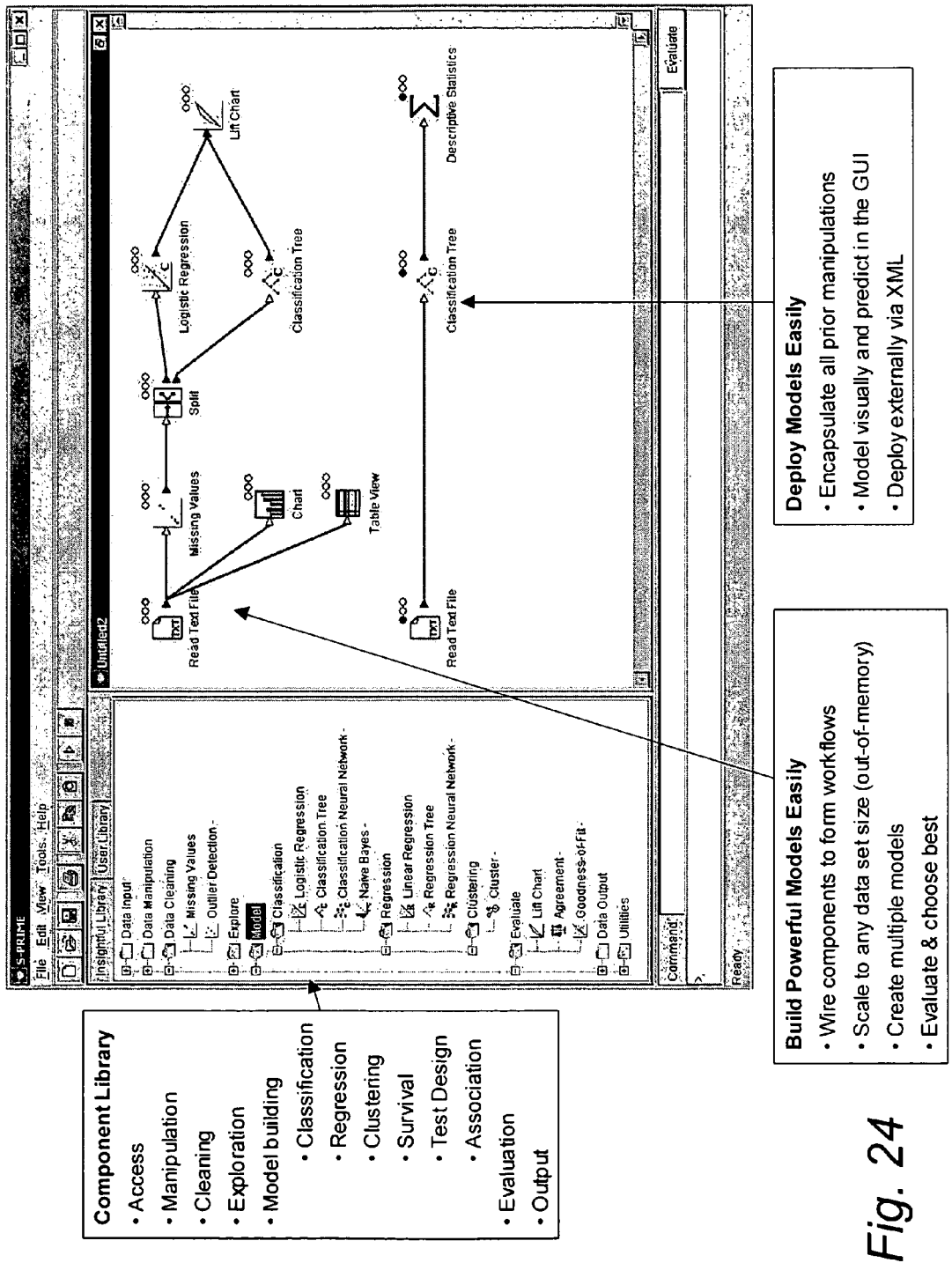
FIG. 24 is an example screen display of a viewer available for an example embodiment of the pipeline architecture that may be integrated with the big data capabilities of S-PLUS.

FIG. 24 is an example screen display of a viewer available for an example embodiment of the pipeline architecture that may be integrated with the big data capabilities of S-PLUS. Specifically, the viewer is enhanced to support the creation and management of workflows, where the nodes can process BDOLS big data objects.

Figure 25:
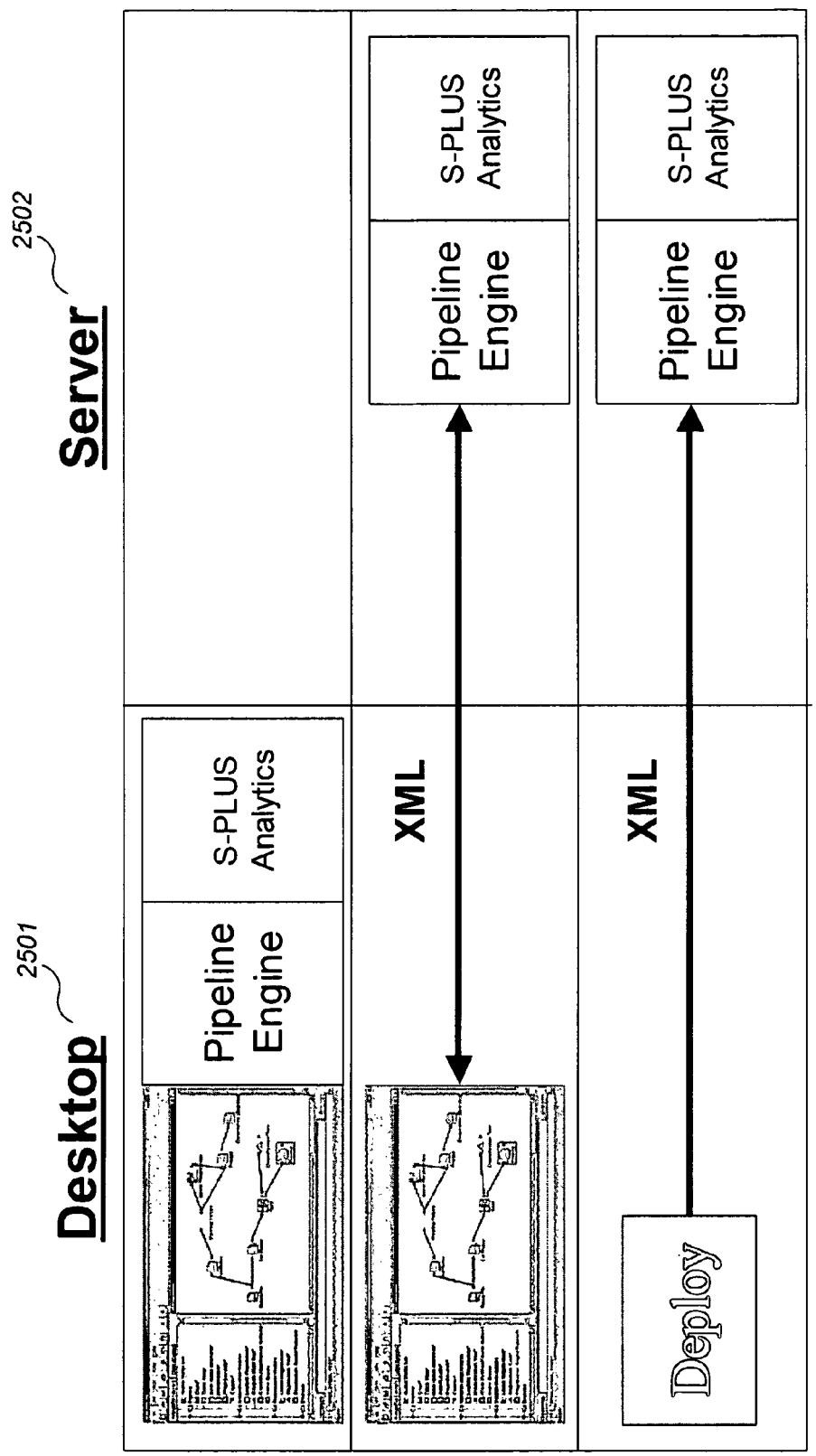
FIG. 25 is an example block diagram depicting various deployment architectures for deploying Big Data Object support that integrates a pipeline engine.

FIG. 25 is an example block diagram depicting various deployment architectures for deploying Big Data Object support that integrates a pipeline engine. Note that a scripting language, such as XML, can be used to integrate other types of access, such as other viewers, to the big data and pipeline capabilities presented herein. In FIG. 25, the Desktop 2501 and the Server 2502 can host various of the different components as desired. Here, S-PLUS analytics refers to programs created using the example BDOLS, however, other analytics using S-PLUS or not, could be similarly incorporated.

Figure 26:
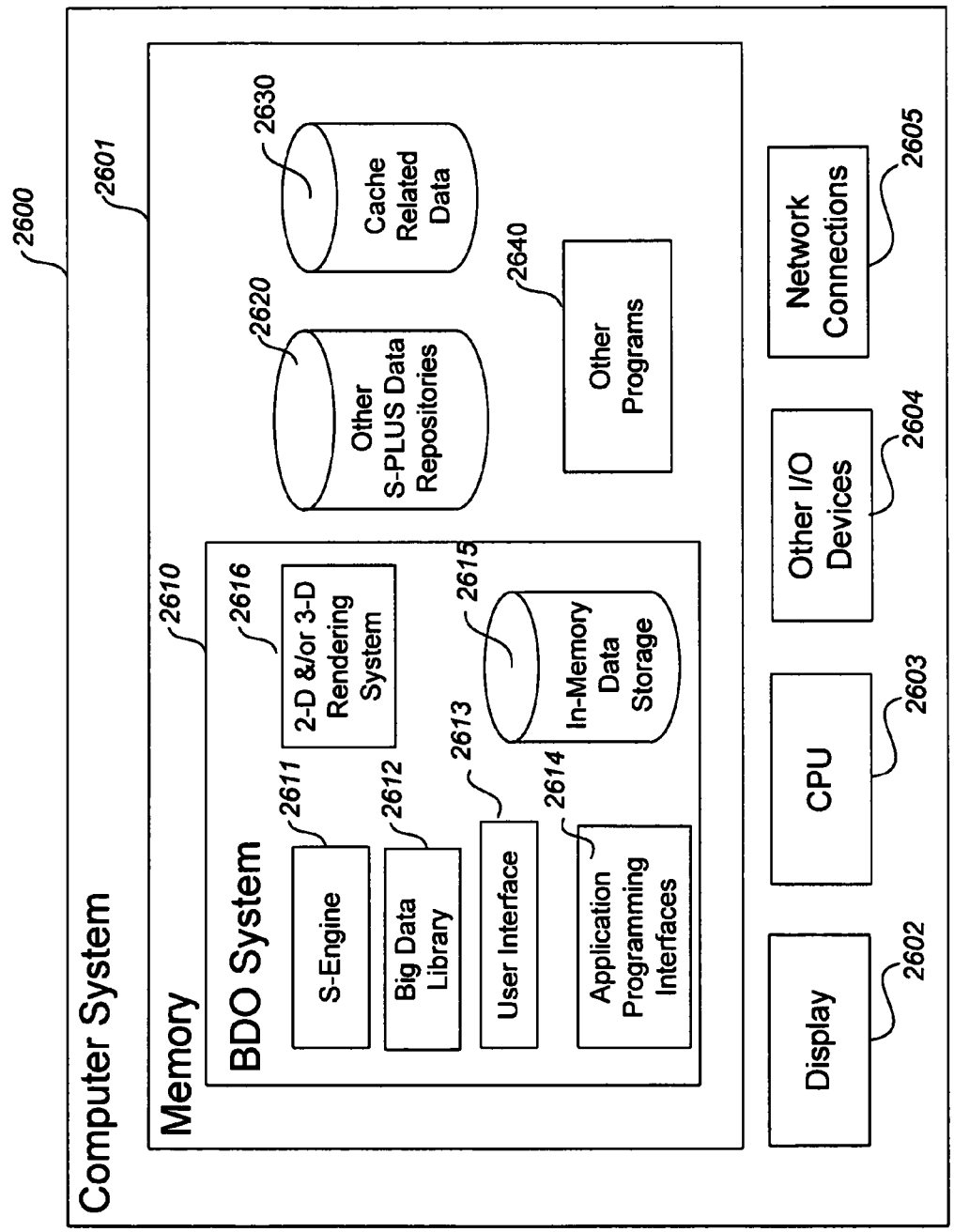
FIG. 26 is an example block diagram of a general purpose computer system for practicing embodiments of a Big Data Object System that provide support for big data objects.

FIG. 26 is an example block diagram of a general purpose computer system for practicing embodiments of a Big Data Object System that provide support for big data objects. The general purpose computer system 2600 may comprise one or more server and/or client computing systems and may span distributed locations. In addition, each block shown may represent one or more such blocks as appropriate to a specific embodiment or may be combined with other blocks. Moreover, the various blocks of the BDOS 2610 may physically reside on one or more machines (as shown in FIG. 25), which use standard or proprietary interprocess communication mechanisms to communicate with each other.

In the embodiment shown, computer system 2600 comprises a computer memory ("memory") 2601, a display 2602, a Central Processing Unit ("CPU") 2603, Input/Output devices 2604, and network connections 2605. The Big Data Object System ("BDOS") 2610 is shown residing in memory 2601. The components of the BDOS 2610 preferably execute on CPU 2603 and manage the generation and use of BDOs, as described in previous figures. Other downloaded code 2640 and potentially other data repositories, such as other S-PLUS data repositories 2620, also reside in the memory 2610, and preferably execute on one or more CPU's 2603. In a typical embodiment, the BDOS 2610 includes an one or more S-Engines 2611, one or more Big Data Object Libraries 2612, a user interface 2613, an application programming interface ("API") 2614, a graphics rendering system 2616, an in-memory data storage system 2615, and (use of) a pipeline engine (not shown). In addition, the cache and related BDO data 2630 is shown residing in memory (here external, although the Figure itself doesn't differentiate the types of memory media.

In an example embodiment, components of the BDOS 2610 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc. In addition, the various components of the illustrated embodiments may be implemented by way of a single monolithic executable running on a single CPU computer system, or alternately decomposed using a variety of structuring techniques known in the art, including but not limited to, multiprogramming, multithreading, client-server, or peer-to-peer, running on one or more computer systems each having one or more CPUs.

In addition, programming interfaces to the data generated by the BDOL 2612 and stored as part of the data storage 2615 or BDO related data 2630 can be available by standard means such as through C, C++, C#, and Java APIs; libraries for accessing files, databases, or other data repositories; through scripting languages such as XML; or through Web servers, FTP servers, or other types of servers providing access to stored data. The various storage repositories may be implemented as one or more database systems, file systems, or any other method known in the art for storing such information, or any combination of the above.

Also the example BDOS 2610 may be implemented in a distributed environment that is comprised of multiple, even heterogeneous, computer systems and networks. For example, in one embodiment, the S-Engine 2611, the BDOL 2612, and the Cache and Related data repository 2630 are all located in physically different computer systems. In another embodiment, various components of the BDOS 2610 are hosted each on a separate server machine and may be remotely located from the cache data which are stored in the data repository 2630. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible.

In example embodiments, these components may execute concurrently and asynchronously; thus the components may communicate using well-known message passing techniques. Equivalent synchronous embodiments are also supported by an BDOL implementation.

Big Data Specific Functions

The following sections describe some specific functions (methods) implemented in an example embodiment of the BDOL, the BDOLS (for S-PLUS). Guidelines for programming with large data sets using S-PLUS are described in Appendix A, incorporated herein by reference in its entirety, which includes a couple of chapters from one of the manuals provided with the product.

In addition to the standard S-PLUS functions, the big data library includes functions specific to big data objects without standard S-PLUS functions as wrappers. Types of functions include:

Functions that create big data objects but do not take big data objects as arguments.

Functions providing additional data exploration or manipulation capabilities.

This section provides an overview of these functions. A listing of all of the big data functions provided in the S-PLUS 7.0 Release is included in Appendix B, which is incorporated herein by reference in its entirety. In addition, Appendix C, which is also incorporated herein by reference in its entirety, details the language reference pages for the big data specific (new) functions in S-PLUS.

a. Data Import and Export

The importData( ) function provides the option of reading data in as either a data.frame or bdFrame.

The exportData( ) function supports export of bdFrames.

b. Big Vector Generation

Functions such as dnorm( ) and pnorm( ) can handle a big data object as their argument. Related functions such as rnorm( ) that generate big data vectors cannot be modified in this way, as they do not take a data object as their argument. Instead, a "bigdata" logical argument is added indicating whether the result should be a vector or bdVector. These include rep( ), seq( ), rnorm( ), and the other random number generation functions.

c. Data Exploration

The following big data specific functions are available for data exploration.

i. bd.cor( )

Computes correlation or covariances for a data set. In addition, it can compute correlations or covariances between a single column and all other columns, rather than computing the full correlation/covariance matrix.

ii. bd.crosstabs( )

Produces a series of tables containing counts for all combinations of the levels in categorical variables.

iii. bd.univariate( )

Computes a wide variety of univariate statistics. It computes most of the statistics returned by PROC UNIVARIATE in the SAS® base product. See Table 2.

The initial implementation includes all statistics available in SAS 6. Based on user feedback, additional statistics added in newer versions of SAS can be implemented as time permits.

TABLE 2 function(x, columns = NULL, by.columns = NULL,
filter.cols = F, silent = F, mu = numeric(0), n =
T, nmiss = T, min = T, max = T, range = T, q3 =
T, median = T, q1 = T, qRange = T, quantiles =
c(99, 95, 90, 10, 5, 1), mean = T, mode = T, sum =
T, sum.weights = T, uss = T, css = T, var = T,
stdev = T, stderr = T, cv = T, skewness = T,
kurtosis = T, t = T, pr.t = T, msign = T, pr.m =
T, sign.rank = T, pr.s = T, normal = T, pr.n = T)

d. Data Manipulation

The following big data specific functions are available for data manipulation.

i. bd.aggregate ( )

Divide a data object into blocks according to the values of one or more columns, and apply aggregation functions to columns within each block.

ii. bd.append ( )

Append one data set to a second data set.

iii. bd.bin ( )

Create new categorical variables from continuous variables by splitting the numeric values into a number of bins. This is useful, for example, if you have an age column; rather than including age as a continuous variable in your models, it might be more beneficial to split it into ranges that make sense demographically (<18, 18-24, 25-35, etc.).

iv. bd.create.columns( )

Create columns based on expressions.

v. bd.duplicated( )

Determine which rows contain duplicate values.

vi. bd.filter.columns( )

Remove one or more columns from a data set.

vii. bd.filter.rows( )

Filter out trows that do/don't satisfy an expression.

viii. bd.model.frame.and.matrix( )

Create a numeric matrix useful for modeling. Performs column creation, subsetting, and missing value handling activity equivalent to that done by the model.frame( ) and model.matrix( ) functions.

ix. bd.modify.columns( )

Change column names or types. Can also be used to drop columns.

x. bd.join( )

Create composite data set from several (2 or more) data sets. For each data set, a set of key columns can be specified which will define which rows get combined in the output. Also, for each data set, whether to output unmatched rows can be specified.

xi. bd.normalize( )

Center and scale continuous variables. Typically, variables are normalized so that they follow a standard Gaussian distribution (means of 0 and standard deviations of 1). To do this, bd. normalize subtracts the mean or median, and then divides by either the range or standard deviation.

xii. bd.partition ( )

Randomly sample the rows of your data set to partition it into three subsets for training, testing, and validating your models.

xiii. bd.remove.missing( )

Drop rows with missing values, or replace missing values with the column mean, a constant, or values generated from an empirical distribution based on the observed values.

xiv. bd.reorder.columns( )

Change the order of the columns in the data set.

xv. bd.sample( )

Sample rows from a dataset, using one of several methods.

xvi. bd.select.rows( )

Extract a block of data, as specified by a set of columns, start row, and end row.

xvii. bd.shuffle( )

Randomly shuffle the rows of your data set, reordering the values in each of the columns as a result.

xviii. bd.sort( )

Sort the data set rows, according to the values of one or more columns.

xix. bd.split ( )

Split a data set into two data sets according to whether each row satisfies an expression. Note that the functions bd.split.by.group and bd.split.by.window work similarly but divide the data by the values of one or more columns and by a defined window (number of rows), respectively.

xx. bd.sql( )

The bd.sql( ) function adds functionality similar to SAS's PROC SQL. This lets the user specify data manipulation operations using SQL syntax.

The Select, Insert, Delete, and Update statements are supported. The SQL commands and column identifiers are case sensitive. SQL interprets periods in names as indicating fields within tables. Hence column names should not contain periods if bd.sql( ) is to be used.

The following SQL functions are not yet implemented in the current embodiment, however, based on user feedback, this functionality may be implemented:

distinct mathematical functions in set or select such as abs( ), round( ), floor( ), etc natural join union merge between subqueries Examples of available SQL supported functionality:

```
"Select" Examples:
    select Fuel from fuel
    select Mileage*Fuel from fuel
    select Weight from fuel where Type!='Van' and Type!='Sporty'
    select Fuel, Weight, Mileage*Weight from fuel order by
        Type, Fuel
    # full outer join by row
        select * from fuel, heart
    # inner join by row
        select * from fuel join heart
    # cross product of all rows in fuel with itself
        select * from fuel cross join fuel
    # inner join of fuel to itself with left key column of Weight
    # and right key column of Type
        select * from fuel left outer join fuel on Weight=Type
    #recursive joins
        select * from fuel left outer join fuel on Weight=Weight
            right outer join fuel on Weight=Weight
    #aggregation
        select avg(Fuel) from fuel group by Type
        select min(Fuel), max(Fuel) from fuel group by Type
        select min(Fuel), max(Fuel) from fuel group by Type having
            avg(Weight) > 3000
    #define column source
        select fuel.Fuel heart.id from fuel, heart
"Insert" Examples:
    #single row insertion (entire row)
        insert into fuel values (1, 1, 1, 1, 'Domestic')
    #single row insertion (selected columns)
        insert into fuel (Fuel, Type) values (1, 'Domestic')
    #multiple row insertion (entire row)
        insert into fuel values (1, 1, 1, 1, 'Domestic') values (2, 2, 2, 2,
            'Domestic')
    #multiple row insertion (selected columns)
        insert into fuel (Fuel, Type) values (1, 'Domestic') values (2,
            'Domestic')
"Delete" Examples:
    #simple row deletion
        delete from fuel where Mileage >= 20 or Type = 'Sporty'
"Update" Examples:
    #apply transformation to all rows in Fuel column
        update fuel set Fuel=Fuel*1.15
    #apply transformation to all only rows where Mileage is 18
        update fuel set Fuel=Fuel*1.15 where Mileage=18
    #apply multiple transformations when Mileage is 18
        update fuel set Fuel=Fuel*1.15, Type='Mileage18'
            where Mileage=18
``` xxi. bd.stack ( )

Combine or stack separate columns of a data set into a single column, replicating values in other columns as necessary.

xxii. bd.transpose( )

Turn a set of columns into a set of rows.

xxiii. bd.unique( )

Indicate which rows contain unique values.

xxiv. bd.unstack( )

Separate one column into a number of columns based on a grouping column.

Time Series Operations

Time series operations will be available primarily through a "bdTimeSeries" class and related functions.

The timeDate class in S-PLUS stores data in Greenwich Mean Time (GMT), but has a time zone attribute that can be used to indicate that the times should be imported, exported, and printed using the time in a different time zone.

The bdTimeDate class does not have the concept of a time zone. It does not store a time zone attribute, and import, export, and printing is always done without respect to a specific time zone.

The "timeConvert" function can be used to convert a time known to be from a particular time zone to the corresponding time in a different time zone. For example, if one sets of times is from Tokyo and another is from New York, the Tokyo times could be converted to the corresponding times in New York before merging the related series.

Standard timeDate and timeSeries methods will be implemented for bdTimeDate and bdTimeSeries.

a. Time Date Creation

The "timeCalendar" and "timeSeq" functions create a "timeDate" object. An argument will be added to indicate that a "bdTimeDate" should be created instead.

| bdTimeDate constructor |
| --- |
| timeCalendar(bigdata=T) |
| timeSeq(bigdata=T) | b. Expression Language Enhancements

The expression language used to specify expressions in bd.create.columns, bd.filter.rows, etc. includes operations between column values in consecutive rows, such as lag (to access earlier rows), lead (to access later rows), and diff (to calculated the difference between a column value and the value from an earlier row).

c. By Operations

Functions "bd.by.window" and "bd.split.by.window" are added. These are similar to "bd.by.group" and "bd.select.by.group", but perform grouping based on a window width and overlap specification.

d. Additional Big Data Classes

Big data objects "bdTimeSpan", and "bdSignalSeries" are added. These are used with bdTimeSeries objects in the same way the small-data equivalents are used with timeSeries objects. Standard methods for these classes are added.

e. Updated Daylight Savings Information

The daylight savings time change information for the built-in time zones has been updated.

Matrix Operations

Unlike earlier versions of S-PLUS, the big data library does not have separate equivalents to "matrix" and "data.frame".

Standard matrix operations are available for big data objects. In algebraic operations, the operators will require the big data objects to have appropriately corresponding dimensions. Rows or columns will not be automatically replicated.

a. Matrix Algebra i. Element-wise addition, subtraction, multiplication, division, logical and comparison operators Addition, subtraction, multiplication, division, logical (!, &, |), and comparison operators (>, <, =, !=, <=, >=) may be performed elementwise between:

A scalar and a bdFrame.

Two bdFrames of the same dimension.

A bdFrame and a single-row bdFrame with the same number of columns.

A bdFrame and a single-column bdFrame with the same number of rows.

ii. Matrix Multiplication

Matrix multiplication is available for two bdFrames with the appropriate dimensions.

iii. Crossproduct

Returns a bdFrame which is the cross product of two given bdFrames, i.e., the matrix product of the transpose of the first bdFrame with the second. This is equivalent to the S-PLUS "crossprod" function.

Graphics Functions a. Hexagonal Binning

Hexagonal Binning is designated as the default technique used when a plotting function that currently plots one point per row is applied to a Big Data object. Hexagonal binning plots are available for:

Single plot (plot)

Matrix of plots (pairs)

Conditioned single or matrix plots (xyplot, splom)

It will be easy to add a regression line or scatterplot smoother to these plots. The regression line or smoother will be a weighted fit based on the binned values.

b. Traditional Graphics

The traditional graphics functions are command line functions predating Trellis. These include:

barplot, boxplot, hist, dotchart, pie, qqnorm, plot,
barplot, boxplot, qqplot, contour, persp, image, points,
lines, symbols, pairs Functions that currently create a point for each observation such as plot( ) and pairs( ) are enhanced to instead create a hexagonal binning plot if used on a Big Data object.

Functions that are based on data summaries such as boxplot( ) and hist( ) are changed to compute the required summaries from the Big Data object.

Functions that evaluate data over a grid such as contour( ), image( ), and persp( )expect a preprocessing function such as interp( ) to be used to aggregate the data.

Functions that add to a plot such as points( ) and lines( )stop with an error message.

c. Trellis Command-Line Graphics

The Trellis graphics functions are command line functions for conditioned graphics. These include:

xyplot, bwplot, stripplot, qq, dotplot, barchart,
piechart, qqmath, histogram, densityplot, splom,
parallel, contourplot, levelplot, wireframe, cloud Functions that currently create a point for each observation such as xyplot( ) and splom( ) are enhanced to instead create a hexagonal binning plot if used on a Big Data object.

Functions that are based on data summaries such as bwplot( ) and histogram( ) are changed to compute the required summaries from the Big Data object.

Functions that evaluate data over a grid such as contourplot( ), levelplot( ), and wireframe( ) expect a preprocessing function such as loess( ) to be used to aggregate the data.

The cloud( ) and parallel( ) functions stop with an error message indicating that these plots are not available for bdFrames.

d. Time Series Graphics

Commonly used plotting functions for timeSeries objects are:

plot, trellisPlot

The plot methods for a bdTimeSeries object use aggregation to reduce the data to a size that can be plotted.

Modeling Functions

Big Data algorithms are available for linear regression, generalized linear regression, clustering, and principal components, as bdLm, bdGLM, and bdPrincomp.

For these models, the standard modeling function, such as "lm," calls the big data modeling function if the "data" argument to "lm" is a big data object. The modeling function returns an object with a class such as "bdLm". Methods are available for "bdLm" corresponding to the methods for "lm". When applied to big data, not all of the "lm" arguments are necessarily available. If an unsupported option is requested, the algorithm stops with an informative error message.

Full capabilities of the S-PLUS formula notation for statistical models will be supported, including multiple terms (y~a+b) transformations of variables (y~log(x)), interactions (y~a*b) and nesting terms (y~b/a), contrast specification for factors.

Not all "lm" methods are necessarily available, as some require information not available in the big data model. For unavailable methods, the function implementing the method will call stop with an informative error message.

Methods available are listed by model type in Appendix B.

a. Big Data Enabled Models

Big Data algorithms are available for the following types of models: Clustering, Generalized Linear Models (gim), Linear Models (lm), and Principal Components (princomp).

b. Other S-PLUS Models

Modeling functions without big data counterparts stop with an error message if passed a bdFrame.

The predict( ) methods for these models are modified to accept a bdFrame as the new data to use in prediction, and to return a bdFrame.

c. New Big Data Algorithm: GLM Families

Additional family, link, and variance functions are implemented for big data.

d. Additional Big Data Algorithms to be Considered for Implementation

Some additional big data algorithms are contemplated for use with S-PLUS, however are not yet present in the example embodiment, including: stepwise regression, generalized additive models, smoothing splines, linear mixed effects models, and tree ensembles.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/669,854, entitled "METHOD AND SYSTEM FOR HANDLING LARGE DATA SETS IN A STATISTICAL LANGUAGE," filed Apr. 7, 2005, is incorporated herein by reference, in its entirety.

From the foregoing it will be appreciated that, although specific embodiments have been described herein for purposes of illustration, various modifications may be made without deviating from the spirit and scope of the present disclosure. For example, the methods and systems for implementing support for large data sets discussed herein are applicable to other architectures other than a S-PLUS architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for performing statistical computations in a statistical programming language on a data set that is larger than can fit in memory practicably, the data set comprising at least one row and at least one column, comprising:
   inputting data from the data set into an external data cache area on an external storage medium, the external data cache area separate from virtual memory of the computing system;
   under control of an interpreter of the statistical programming language, generating an in-memory data structure that contains an indicator to the external data cache area; and
   under control of an interpreter of the statistical programming language, performing in memory a statistical computation, defined using the statistical programming language, on the inputted data, the data larger than can fit into physical and, when present, virtual memory practicably at once, by accessing and processing the data from the external data cache area a portion at a time through the generated in-memory structure.

2. The method of claim 1, further comprising:
   computing summary statistics on each column of the data set as it is input; and
   storing the computed summary statistics in a metadata file on an external storage medium.

3. The method of claim 2 wherein the metadata file is associated with the in-memory data structure, such that statistical information can be provided regarding the data set without accessing the data stored in the external data cache.

4. The method of claim 2 wherein the summary statistics include at least one of a mean value, a minimum value, a maximum value, or a standard deviation of the values of the column data.

5. The method of claim 2 wherein the summary statistics provide a count of number of occurrences of a categorical value.

6. The method of claim 1 wherein the data stored in the external data cache is binary data.

7. The method of claim 1 wherein the statistical computation is performed using S-PLUS language.

8. The method of claim 1 wherein the statistical computation is a user-defined function that processes input data a block at a time.

9. The method of claim 8 wherein the block is a row.

10. The method of claim 1 wherein the portion of data accessed and processed at a time is at least one of a row, a determined number of rows, and/or is configurable.

11. The method of claim 1 wherein the performing the statistical computation is at least one of performing a data cleaning operation, a data manipulation operation, a data transformation operation, a data modeling operation, or a data visualization operation.

12. The method of claim 1, further comprising:
   presenting the processed data using hexagonal binning techniques.

13. The method of claim 1, further comprising:
   presenting a Trellis plot of the processed data using hexagonal binning techniques.

14. The method of claim 1 wherein the performing the statistical computation on the data further comprises:
   performing a statistical computation on the data by using a pipeline engine to access and process the data a portion at a time.

15. The method of claim 1 wherein the statistical computation is at least one of performing a linear regression, a generalized linear regression, clustering, or principal components analysis.

16. A computer-readable memory medium whose contents, when executed, cause a computing device to handle a large data set for statistical processing, by performing a method comprising:
   inputting data from the data set into an external data cache area on an external storage medium, the external data cache area separate from virtual memory of the computing device;
   generating an in-memory data structure that contains an indicator to the external data cache area; and
   performing in memory a statistical computation, defined using a statistical programming language, on the inputted data, the data larger than can fit into physical and, when present, virtual memory practicably at once, by accessing and processing the data from the external data cache area a portion at a time through the generated in-memory structure.

17. The computer-readable medium of claim 16 wherein the computer-readable memory medium is a memory of a computing device.

18. The computer-readable memory medium of claim 16 wherein the contents are instructions that, when executed, cause the computing device to perform the method.

19. A computing system, comprising:
   a random access memory ("RAM");
   an external storage medium;
   a code module stored in the computing system, configured to:
      instantiate an object in RAM that points to an external data cache stored on the external storage medium, the external data cache separate from any virtual memory of the computing system;
      retrieve, from a data set, data that is larger than can be stored in the RAM and, when present, virtual memory, without causing the computing system to thrash, and store the retrieved data in the external data cache; and
      provide a function for accessing and processing data stored in the external data cache a block at a time; and
   a statistical component defined in a statistical programming language that is configured to:
      invoke the code module to instantiated the object, input data from an external source, and store the inputted data in the external data cache;
      retrieve the stored data from the external data cache through the instantiated object and perform statistical modeling of the data using out-of-memory techniques that invoke the provided function to access and model the data a block at a time from the external data cache.

20. The computing system of claim 19 wherein the function of the code module for processing data stored in the external cache operates through a pipeline engine.

21. The computing system of claim 19 wherein the statistical modeling provides at least one of a linear regression; a generalized linear regression, clustering, or a principal components analysis of the data stored in the external cache.

22. The computing system of claim 19, further comprising: a graphical presentation component that provides a visualization of the data stored in the external cache using hexagonal binning techniques.

23. The computing system of claim 22 wherein the graphical presentation component provides the visualization using Trellis plots.

* * * * *